US011630927B2

United States Patent
Yin et al.

(10) Patent No.: US 11,630,927 B2
(45) Date of Patent: Apr. 18, 2023

(54) METHOD AND SYSTEM FOR PROCESSING BUILDING ENERGY INFORMATION

(71) Applicant: RUENTEX ENGINEERING & CONSTRUCTION CO., LTD., Taipei (TW)

(72) Inventors: Samuel Yin, Taipei (TW); Wu-Sung Chen, Taipei (TW); Jui-Chen Wang, Taipei (TW); Ming-Huang Lin, Taipei (TW); Wen-Kuei Chang, Taipei (TW)

(73) Assignee: RUENTEX ENGINEERING & CONSTRUCTION CO., LTD., Taipei (CN)

( * ) Notice: Subject to any disclaimer, the term of this patent is extended or adjusted under 35 U.S.C. 154(b) by 647 days.

(21) Appl. No.: 16/601,891

(22) Filed: Oct. 15, 2019

(65) Prior Publication Data

US 2021/0109998 A1   Apr. 15, 2021

(51) Int. Cl.
*G06F 119/06* (2020.01)
*G06F 30/18* (2020.01)
(Continued)

(52) U.S. Cl.
CPC .......... *G06F 30/18* (2020.01); *G06F 16/9017* (2019.01); *G06F 16/9035* (2019.01);
(Continued)

(58) Field of Classification Search
CPC .. G06F 30/18; G06F 16/9017; G06F 16/9035; G06F 2119/06; G06F 30/13;
(Continued)

(56) References Cited

U.S. PATENT DOCUMENTS

| 9,674,065 B2 * | 6/2017 | Jiang .................. H04L 41/0681 370/252 |
| 10,816,941 B2 * | 10/2020 | Frey ........................ F24F 11/46 |
| 2009/0254222 A1 | 10/2009 | Berman et al. |

FOREIGN PATENT DOCUMENTS

| CN | 102165132 A | 8/2011 |
| CN | 104764173 * | 3/2014 ............. F24F 11/30 |

(Continued)

OTHER PUBLICATIONS

Bottaccioli, Lorenzo, et al. "Building Energy Modelling and Monitoring by Integration of IoT Devices and Building Information Models." IEEE Xplore, Jul. 1, 2017, ieeexplore.ieee.org/stamp/stamp.jsp?tp=&arnumber=8029717. (Year: 2017).*

(Continued)

*Primary Examiner* — Juan C Ochoa
(74) *Attorney, Agent, or Firm* — Juan Carlos A. Marquez; Marquez IP Law Office, PLLC

(57) ABSTRACT

The present invention relates to a method and a system for processing building energy information. The method includes the following steps: inputting data of a building information model into building energy simulation software; automatically selecting a building category or manually selecting a building category from a group of building categories provided by the building energy simulation software; in response to the selected building category, inputting a plurality of parameters into a lookup table of the building energy simulation software in accordance with a database of the building energy simulation software; and generating an estimation of a building's energy consumption through a calculation by the building energy simulation software based on the parameters.

20 Claims, 23 Drawing Sheets

(51) Int. Cl.
*G06F 16/901* (2019.01)
*G06F 16/9035* (2019.01)
*H02J 3/00* (2006.01)

(52) U.S. Cl.
CPC ............ *H02J 3/00* (2013.01); *G06F 2119/06* (2020.01); *H02J 3/003* (2020.01); *H02J 2203/20* (2020.01)

(58) Field of Classification Search
CPC ...... G06F 2119/08; G06F 30/12; G06F 30/01; G06F 16/903; G06F 2111/02; G06F 2111/04; G06F 2111/06; G06F 2111/08; G06F 2111/10; G06F 2111/12; G06F 2111/14; G06F 2111/16; G06F 2111/20; G06F 2113/00; G06F 2113/02; G06F 2113/04; G06F 2113/06; G06F 2113/08; G06F 2113/10; G06F 2113/12; G06F 2113/14; G06F 2113/16; G06F 2113/18; G06F 2113/20; G06F 2113/22; G06F 2113/24; G06F 2113/26; G06F 2113/28; G06F 2115/00; G06F 2115/02; G06F 2115/04; G06F 2115/06; G06F 2115/08; G06F 2115/10; G06F 2115/12; G06F 2117/00; G06F 2117/02; G06F 2117/04; G06F 2117/06; G06F 2117/08; G06F 2117/10; G06F 2117/12; G06F 2119/00; G06F 2119/02; G06F 2119/04; G06F 2119/10; G06F 2119/12; G06F 2119/14; G06F 2119/16; G06F 2119/18; G06F 2119/20; G06F 2119/22; H02J 3/00; H02J 3/003; H02J 2203/20; H02J 2310/12; H02J 13/0006; Y02E 60/00; Y04S 40/20; G06Q 10/0637; G06Q 50/06
USPC .......................................................... 703/1
See application file for complete search history.

(56) References Cited

FOREIGN PATENT DOCUMENTS

| CN | 105453107 A | 3/2016 |
|---|---|---|
| CN | 102326164 B | 6/2016 |
| CN | 107208415 A | 9/2017 |
| TW | 201838945 A | 11/2018 |
| TW | I672665 B | 9/2019 |

OTHER PUBLICATIONS

Bowers, Doug. "Enhanced Building and Space Types for Revit 2018." Applying Technology to Architecture, May 17, 2017, aectechtalk.wordpress.com/2017/05/17/enhanced-building-and-space-types-for-revit-2018/. (Year: 2017).*

Kozak, Lukas. Energy Consumption-Threshold Monitoring System. May 2011, chrome-extension://efaidnbmnnnibpcajpcglclefindmkaj/www.theseus.fi/bitstream/handle/10024/28994/lukas_kozak_thesis_online_version.pdf;jsessionid=D656753F0384F402B584610149F70EC2?sequence=1. (Year: 2011).*

Armando Pinto, Fernanda Rodrigues, André Mota, Geothermal contribution on southern Europe climate for energy efficiency of university buildings. Winter season, Energy Procedia, vol. 134, 2017, pp. 181-191, ISSN 1876-6102, https://doi.org/10.1016/j.egypro.2017.09.556 (Year: 2017).*

Dowhower, Justin. Adapting Building Information Modeling (BIM) for Affordable & Sustainable Housing. May 2010. (Year: 2010).*

Motamedi, Ali. Lifecycle Management of Facilities Components Using Radio Frequency Identification and Building Information Model. Jun. 2009. (Year: 2009).*

University, Autodesk. "Powering BIM—Capitalizing on Revit for Building Energy Modeling." Autodesk University, Mar. 31, 2017, medium.com/autodesk-university/powering-bim-capitalizing-on-revit-for-building-energy-modeling-8e9509a624 (Year: 2017).*

Jong Bum Kim, WoonSeong Jeong, Mark J. Clayton, Jeff S. Haberl, Wei Yan, Developing a physical BIM library for building thermal energy simulation, Automation in Construction, vol. 50, 2015, pp. 16-28, ISSN 0926-5805, https://doi.org/10.1016/j.autcon.2014.10.011 (Year: 2014).*

Taiwan Office Action with Search Report dated Sep. 4, 2020 in the counterpart Taiwan Application No. 108137050, 11 pages in Chinese.

\* cited by examiner

Standard building information modeling

Model type [Office building ˅] — 600

602 — Office:
Persons: [5] m²/person — 602a    Light density: [20] W/m² — 602b    Equipment density: [20] W/m² — 602c 604 — Meeting room:
Persons: [2.5] m²/person — 604a    Light density: [20] W/m² — 604b    Equipment density: [10] W/m² — 604c 606 — Lobby:
Persons: [10] m²/person    Light density: [15] W/m²    Equipment density: [0] W/m²

608 — Hallway:
Persons: [33] m²/person    Light density: [15] W/m²    Equipment density: [0] W/m²

610 — Others:
Persons: [10] m²/person    Light density: [10] W/m²    Equipment density: [5] W/m²

FIG. 13

| Space Name | Space Type | | |
|---|---|---|---|
| 622 — 10A | 638 — Office room | Add | Cancel |
| 624 — 10B | 640 — Meeting room | Add | Cancel |
| 626 — 10C | 642 — Meeting room | Add | Cancel |
| 628 — 10D | 644 — Office room | Add | Cancel |
| 630 — 10E | 646 — Office room | Add | Cancel |
| 632 — 10F | 648 — Lobby | Add | Cancel |
| 634 — 10G | 650 — Restroom | Add | Cancel |
| 636 — 10H | 652 — Stairs | Add | Cancel |

FIG. 14

Standard building information modeling

Model type: [Office building ⌄]

602 — Office room:
Ratio: [60] %  Persons: [5] m²/person  Light density: [20] W/m²  Equipment density: [20] W/m²

604 — Meeting room:
Ratio: [10] %  Persons: [2.5] m²/person  Light density: [20] W/m²  Equipment density: [10] W/m²

606 — Lobby:
Ratio: [5] %  Persons: [10] m²/person  Light density: [15] W/m²  Equipment density: [5] W/m²

608 — Hallway:
Ratio: [10] %  Persons: [33] m²/person  Light density: [15] W/m²  Equipment density: [5] W/m²

610 — Others:
Ratio: [15] %  Persons: [10] m²/person  Light density: [10] W/m²  Equipment density: [10] W/m²

FIG. 16

Exterior Wall structure

U value of roof [674] W/m²-K — 684 Roof [Design Specifications of Building Technical Regulations] [Design Specifications of ASHRAE] 690 [Customize] 694

U value of exterior wall [676] W/m²-K — 686 Exterior wall [Design Specifications of Building Technical Regulations] [Design Specifications of ASHRAE] 692 [Customize] 696

U value of window [678] W/m²-K — 688 Window [Design Specifications of Building Technical Regulations] [Customize] 698

SHGC value of window (0~0.99) [680]

VT value of window (0~0.99) [682]

FIG. 17

Building comparison diagram

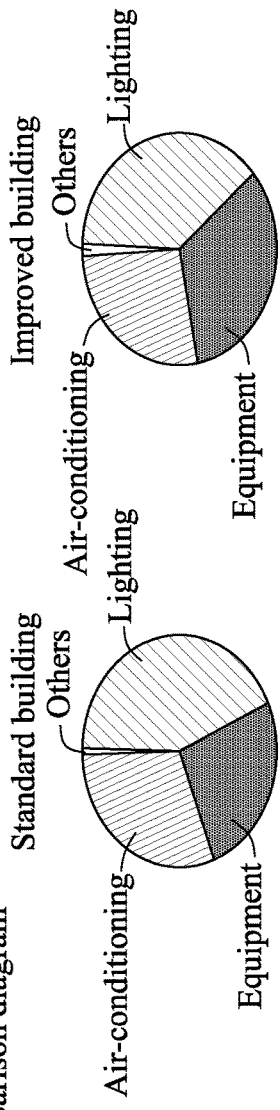

| | Electricity[kWh] | Natural gas[m³] | Other fuels[m³] | District cooling[kWh] | District heating[kWh] | water[m³] |
|---|---|---|---|---|---|---|
| Heating | 0 | 0 | 0 | 0 | 0 | 0 |
| Cooling | 4438.92 | 0 | 0 | 0 | 0 | 0 |
| Interior lighting | 4833.37 | 0 | 0 | 0 | 0 | 0 |
| Outdoor lighting | 1497.23 | 0 | 0 | 0 | 0 | 0 |
| Interior equipment | 3841.7 | 0 | 0 | 0 | 0 | 0 |
| Outdoor equipment | 0 | 0 | 0 | 0 | 0 | 0 |
| Fan | 52.78 | 0 | 0 | 0 | 0 | 0 |
| Pump | 0 | 0 | 0 | 0 | 0 | 0 |
| Cooling tower | 0 | 0 | 0 | 0 | 0 | 0 |
| Moisturizer | 0 | 0 | 0 | 0 | 0 | 0 |
| Heat recycling | 0 | 0 | 0 | 0 | 0 | 0 |
| Water supply | 0 | 0 | 0 | 0 | 0 | 0 |
| Freezing | 0 | 0 | 0 | 0 | 0 | 0 |
| Generator | 0 | 0 | 0 | 0 | 0 | 0 |
| Total | 14664 | 0 | 0 | 0 | 0 | 0 |

Building area [m²] 200.00

Standard building | Improved building

FIG. 22C

METHOD AND SYSTEM FOR PROCESSING BUILDING ENERGY INFORMATION

TECHNICAL FIELD

The present disclosure relates to a method and a system for data processing, and more particularly to a method and a system for processing building energy information.

BACKGROUND

Due to the decline of natural resources on Earth, saving energy has become a major issue in modern society. A push towards designing greener buildings is essential for humanity, as average buildings may consume considerable energy via complex machinery used in water, electrical, and air conditioning systems. In order to save energy, thoroughly evaluating energy consumption—as well as efficiently arranging the facilities in each part of a building—becomes an important challenge for architects and builders.

In recent years, to effectively measure the energy consumption of a building for use in energy-efficient design strategies, building energy simulation software has been widely adopted. Specifically, the process of energy simulation mainly includes: collecting data, inputting the building's geometry and setting and simulation parameters, and performing simulation analysis, etc. However, data and settings need to be manually inputted into building energy simulation software, and mistakes frequently occur with manual inputting. Furthermore, since the parameters of a building information model are wide-ranging and complex, a user may have little knowledge of such complex data or information, so that he or she may be unable to discover or correct errors in data input. Therefore, the results of an analysis could be considerably imprecise.

Accordingly, it is greatly desired to provide a method and a system for processing building energy information that can be used to correctly and efficiently estimate the energy consumption of a building.

SUMMARY OF INVENTION

To this end, the present disclosure provides a method and a system for processing building energy information, which can provide multiple predetermined values for multiple parameters of the building energy information in accordance with a database of building energy simulation software such that a result of estimation can be correctly and efficiently calculated.

According to one aspect of the present disclosure, a method for processing building energy information includes the following steps: (1) inputting data of a building information model into building energy simulation software; (2) automatically selecting a building category or manually selecting a building category from a group of building categories provided by the building energy simulation software; (3) in response to the selected building category, inputting a plurality of parameters into a lookup table of the building energy simulation software in accordance with a database of the building energy simulation software; and (4) generating an estimation of a building's energy consumption through a calculation by the building energy simulation software based on the parameters.

According to another aspect of the present disclosure, a system for processing building energy information includes: a non-transitory computer-readable storage medium comprising computer-readable instructions and one or more processors configured to receive the computer-readable instructions to perform: (1) inputting building information modeling information into building energy simulation software; (2) automatically selecting a building category or manually selecting a building category from a group of building categories provided by the building energy simulation software; (3) in response to the selected building category, inputting multiple parameters into a lookup table of the building energy simulation software in accordance with a database of the building energy simulation software; and (4) generating an estimation of a building's energy consumption through a calculation by the building energy simulation software based on the parameters.

BRIEF DESCRIPTION OF THE DRAWINGS

The present disclosure as well as a preferred mode of use, further objectives, and advantages thereof will be best understood by referring to the following detailed description of illustrative embodiments in conjunction with the accompanying drawings, wherein:

FIG. 13 is a first lookup table used in a step of setting up a standard building model in accordance with the first embodiment of the present disclosure.

FIG. 14 is a second lookup table used in the step of setting up a standard building model in accordance with the first embodiment of the present disclosure.

FIG. 16 is a third lookup table used in the step of setting up a standard building model in accordance with a second embodiment of the present disclosure.

FIG. 17 is a fourth lookup table used in the step of setting up a standard building model in accordance with the second embodiment of the present disclosure.

FIG. 22C is a third analytic diagram of a result of an estimation in accordance with an embodiment of the present disclosure.

DETAILED DESCRIPTION

Figure 1:
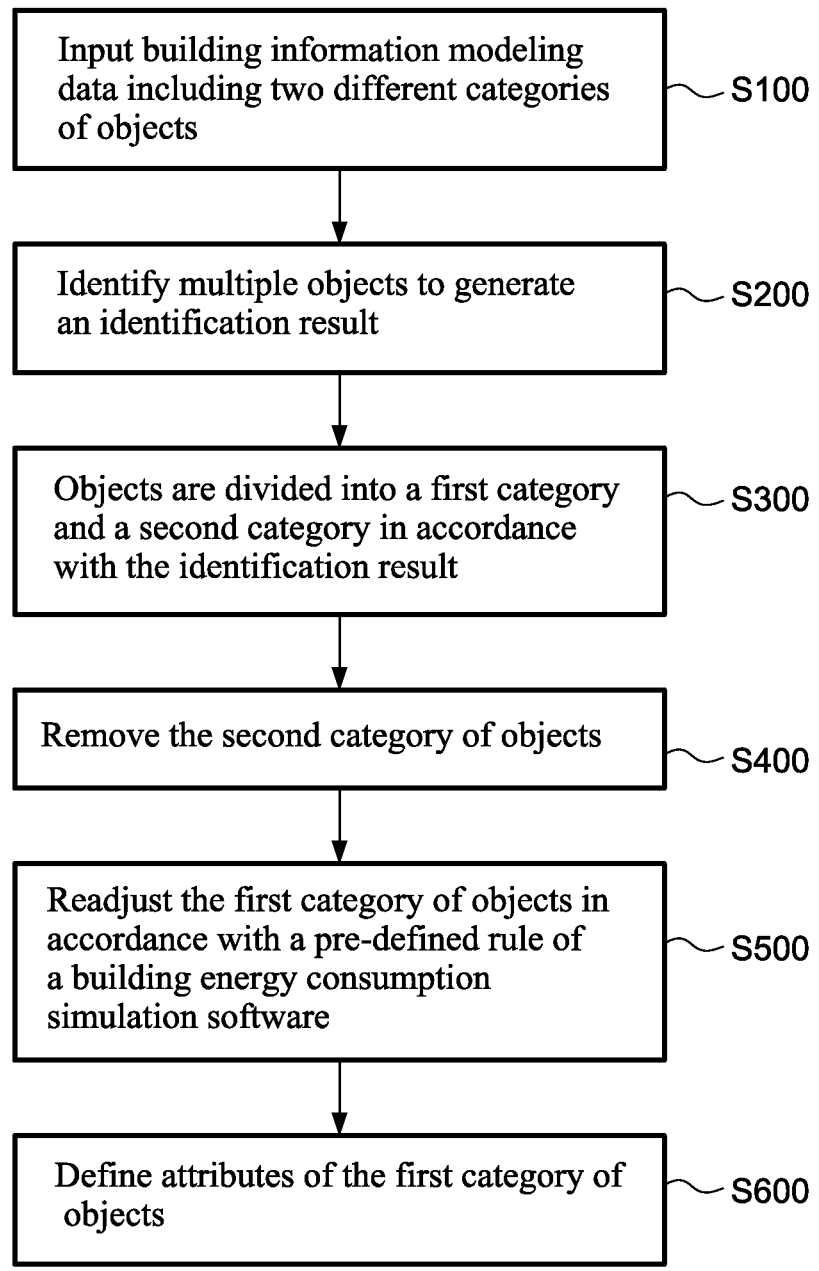
FIG. 1 is a flow chart showing the steps of a method for processing building information modeling data in accordance with a first embodiment of the present disclosure.

The characteristics, subject matter, advantages, and effects of the present disclosure are detailed hereinafter by reference to embodiments of the present disclosure and the accompanying drawings. It is understood that the drawings referred to in the following description are intended only for purposes of illustration, and do not necessarily show the actual proportion and precise arrangement of the embodiments. Therefore, the proportion and arrangement shown in the drawings should not be construed as limiting or restricting the scope of the present disclosure.

The present disclosure provides a method and a system for processing building energy information. The method also includes processing building information modeling (BIM) data which may be a three-dimensional building representation (mock-up) used by general contractors. The method may be operated in a system (for example, a computing device using Microsoft Windows software) including one or more processors (for example, central processing units, CPUs) and a storage medium. The storage medium may be a non-transitory computer-readable storage medium comprising computer-readable instructions. The processor may be configured to receive the computer-readable instructions to carry out the technical elements of the present disclosure in order to achieve advantageous effects.

The present disclosure describes a method for processing building information modeling data used by general contractors to convert and upload the data into building energy consumption simulation software, which can then use the data to calculate the energy consumption of the building information model.

Figure 2:
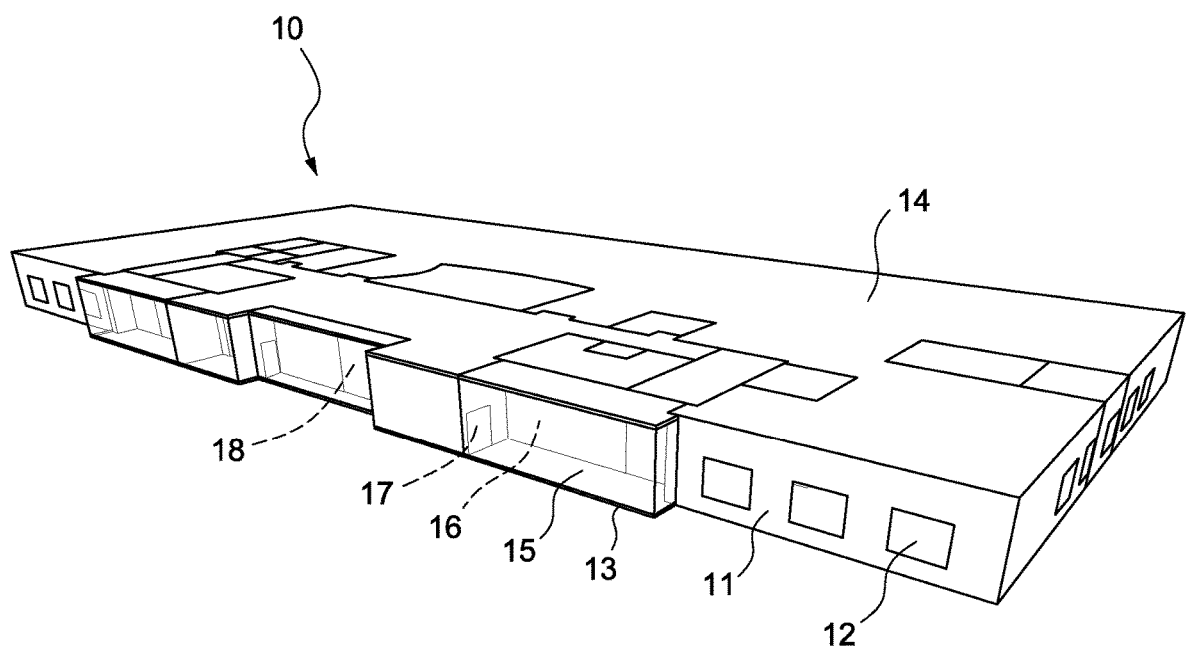
FIG. 2 is a schematic perspective view of a building information modeling in accordance with one embodiment of the present disclosure.

FIG. 1 is a flow chart of a method for processing building information modeling data in accordance with a first embodiment of the present disclosure, and FIG. 2 is a schematic perspective view of a building information model in accordance with one embodiment of the present disclosure. Referring to FIGS. 1 and 2, the method for processing building information modeling data includes the steps described below. In step S100, building information modeling data are inputted, and the data includes two different categories of objects. In this embodiment, building information modeling data may be a three-dimensional drawing file which depicts a floor (storey) 10 of a building. The floor 10 includes different categories of objects, for example, an exterior wall, an exterior window, a top board, a floor plate, an (inner) partition wall, a door, an inner window, a lamp and fixtures, conduits and others. In this embodiment, step S100 further includes inputting (or uploading) the building information modeling data into a first software program, for example, a three-dimensional modeling computer program, Autodesk Revit, that can perform the steps shown in FIG. 1.

In step S200, multiple objects are identified to generate identification results. Categories of multiple objects are identified and may be, but are not limited to, an exterior wall 11, an exterior window 12, a bottom board 13, a top board 14, a roof, a (glass) curtain wall 15, a partition wall 16, a conduit shaft wall, a decoration wall, an inner door 17, an inner window 18, conduits and furniture.

In step S300, objects are divided into a first category and a second category in accordance with the identification results. Then, in step S400, the second category of objects is removed (that is, deleted or cancelled). In this embodiment, the first category of objects may at least include at least one of an exterior wall 11, an exterior window 12, a bottom board 13, a top board 14, a curtain wall 15, a partition wall 16 and a roof. The second category of objects may at least include at least one of a conduit shaft wall, a decoration wall, an inner door 17, an inner window 18, a conduit and furniture. Generally, three-dimensional drawing files used for construction include an abundance of construction information and depict all details of buildings. However, such comprehensive details (for example, in the second category of objects) do not substantively affect the calculation of energy consumption of the entire building, but may affect the precision or even correctness of the evaluation or estimation calculated by building energy consumption simulation software. Thus, redundant and unnecessary objects for construction (that is, objects under the second category) can be removed for calculation of energy consumption of a building. Furthermore, the building energy model file—for building energy consumption simulation software—needs to be compatible with (or conform to) a specific format, and thus in step S400, objects are divided into the first and second categories wherein the second category of objects (that is, objects under the second category) is later removed. For example, a partition wall 16 is generally installed with an inner window (made of glass) or a door. However, such inner window or door has little impact on heat transfer between two spaces separated by the partition wall 16. Hence, to facilitate and effectively simplify the calculation, the inner window and the door installed on the partition wall 16 are removed from consideration while the partition wall 16 itself is retained. In addition, in some embodiments of the present disclosure, the objects may be divided into the first and second categories in accordance with a built-in lookup list in the software. Furthermore, in other embodiments, the objects may be manually divided into the first and second categories by a user.

In step S500, the first category of objects is readjusted in accordance with a pre-defined rule provided in building energy consumption simulation software (i.e., building energy simulation software). That being said, in order to make the current building information modeling data compatible with the format adopted by the building energy consumption simulation software, the first category of objects needs to be adjusted. It should be noted that in this embodiment, the step S400 of removing the second category of objects is performed before the step S500 of readjusting the first category of objects is performed. However, in other embodiments, the step S500 may be performed before the step S400 of removing the second category of objects.

Figure 3:
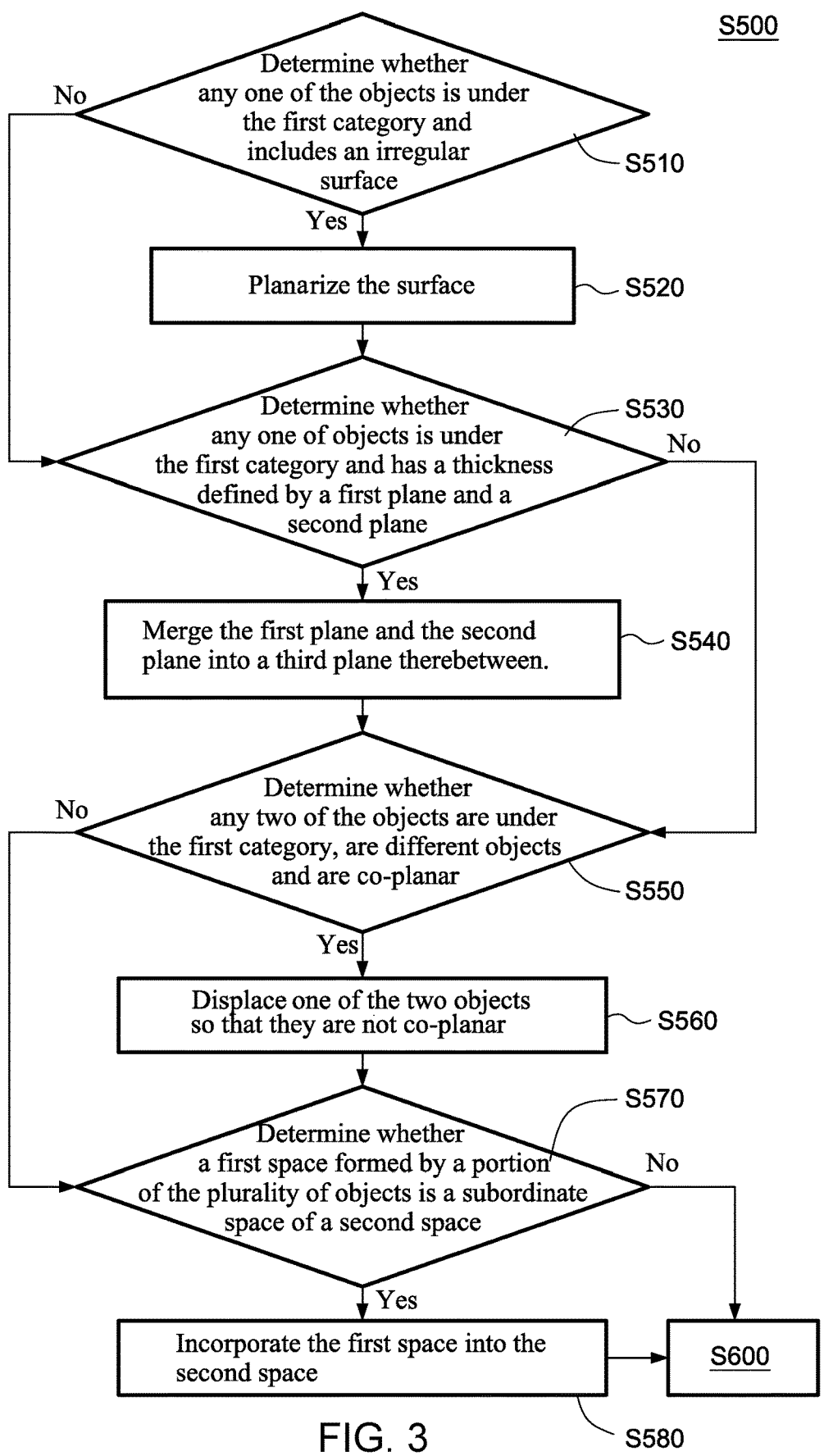
FIG. 3 is a flow chart showing the steps of readjusting objects under a first category in the method for processing the building information modeling data in accordance with the first embodiment of the present disclosure.
Figure 4A:
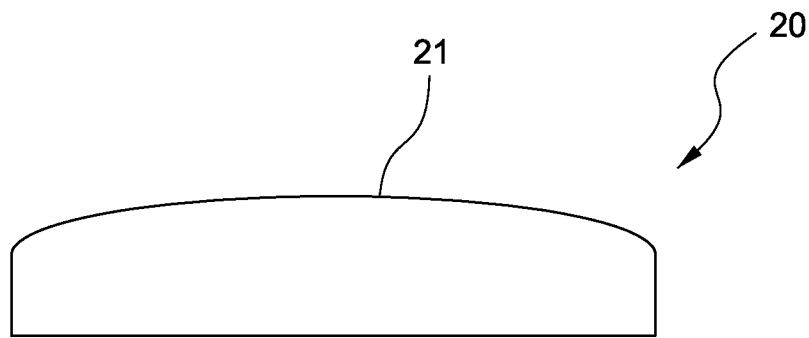
FIGS. 4A and 4B are schematic top views of an object when steps S510 and S520 are performed on the object, respectively.
Figure 4B:
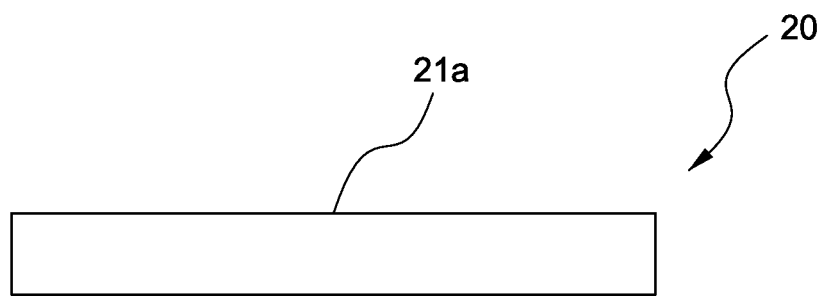

FIG. 3 is a flow chart of a step of readjusting a first category of objects of the method for processing the building information modeling data in accordance with the first embodiment of the present disclosure. Referring to FIG. 3, in this embodiment, step S500 of readjusting the first category of objects further includes the steps described below. In step S510, whether any one of the objects is under the first category—or includes an irregular surface—is determined. When an object is under the first category and has an irregular surface, then step S520 is performed, which planarizes the surface. The term "planarize" or "planarization" refers to an act that shapes a non-planar surface into a planar surface (plane). When an object does not belong to the first category or does not have an irregular surface, or step S520 has been performed, then step S530 is performed. FIGS. 4A and 4B are schematic top views of an object when steps S510 and S520 are performed on the object, respectively. As shown in FIG. 4A, an object 20 is a wall that has a protruding (or convex) surface 21. Because the protruding surface 21 is not a plane (that is, having an irregular shape as defined in this embodiment), then in step S520, the protruding surface 21 is planarized, as shown in FIG. 4B. Therefore, the object 20 is adjusted to simplify an energy consumption calculation without substantially affecting the accuracy of said calculation.

Figure 5A:
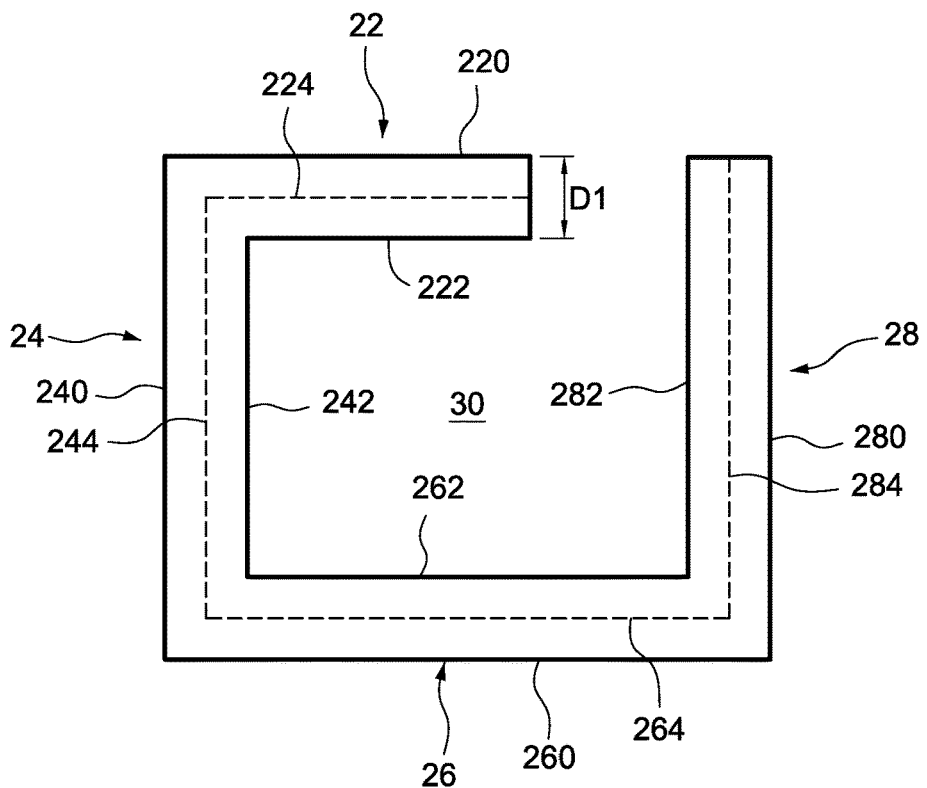
FIGS. 5A and 5B are schematic top views of multiple objects when steps S530 and S540 are performed on the multiple objects, respectively.
Figure 5B:
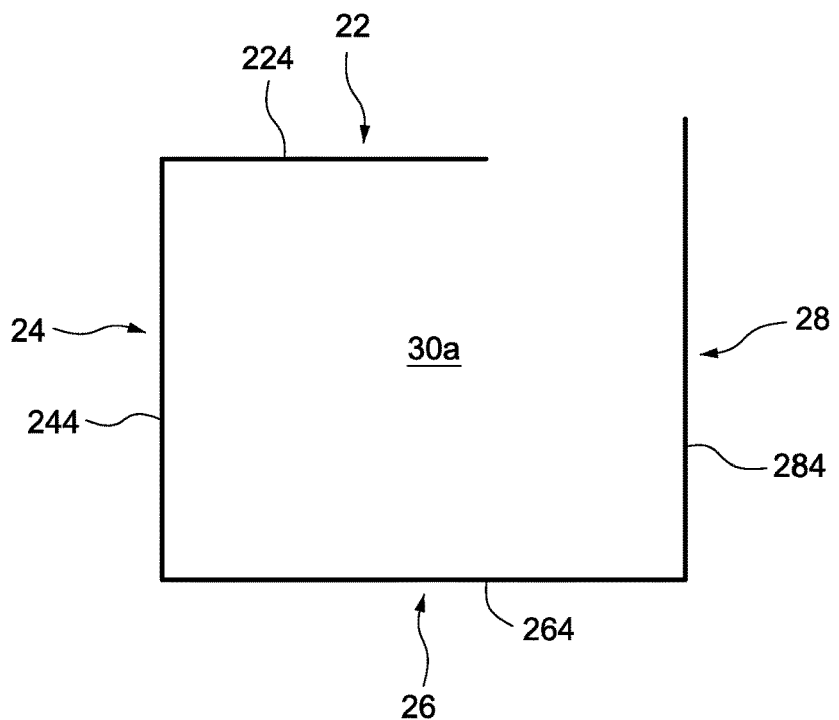

FIG. 3 illustrates whether it can be determined that any one of the objects is under the first category and has a thickness defined by a first plane and a second plane (in step S530). When an object is under the first category and has a thickness (for example, the thickness is greater than 0.1 cm), then step S540 is performed, which merges the first plane and the second plane into a third plane (a virtual plane) between them. In one embodiment, the third plane is substantially in the middle of the first plane and the second plane. When an object is not under the first category or does not have a thickness, or step S540 has been performed, then step S550 is performed. FIGS. 5A and 5B are schematic top views that illustrate performing steps S530 and S540 on multiple objects, respectively. In FIG. 5A, objects 22, 24, 26, 28 are walls that encompass and form a space 30, for example, an office space or a bedroom. Objects 22, 24, 26, 28 have exterior wall surfaces 220, 240, 260, 280 and interior wall surfaces 222, 242, 262, 282, respectively. In this embodiment, the exterior wall surfaces 220, 240, 260, 280 and the interior wall surfaces 222, 242, 262, 282 are planes. Take the object 22 for example; when it is determined that the object 22 has a first plane (that is, exterior wall surface 220) and a second plane (that is, interior wall surface 222) and has a thickness D1 defined therebetween, then a virtual third plane 224 is formed (shown in dotted lines in FIG. 5A). Also, the third plane 224 in this embodiment is located in the middle of the exterior wall surface 220 and the interior wall surface 222. Next, in order to facilitate the calculation, the exterior wall surface 220 and the interior wall surface 222 are removed, and the third plane 224 is retained, as shown in FIG. 5B. That is, for performing the calculation, third planes 244, 264, 284 of objects 24, 26, 28 are created (shown in dotted lines of FIG. 5A), and exterior wall surfaces 240, 260, 280 and interior wall surfaces 242, 262, 282 of the objects 24, 26, 28 are removed. Hence, space 30a (shown in solid lines of FIG. 5B) is formed and encompassed by third planes 224, 244, 264, 284 of the objects 22, 24, 26, 28. Although the volume of the space 30a shown in FIG. 5B is slightly different from the space 30 shown in FIG. 5A, such difference does not substantially affect the energy consumption calculation. As shown in FIG. 5A and FIG. 5B, the space 30a formed and encompassed by the third planes 224, 244, 264, 284 of the objects 22, 24, 26, 28 is substantively the same as space 30.

Figure 6A:
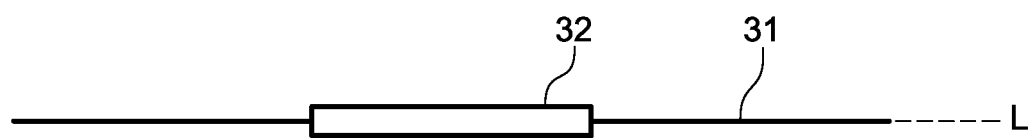
FIGS. 6A and 6B are schematic top views of two objects when steps S550 and S560 are performed on the two objects, respectively.
Figure 6B:
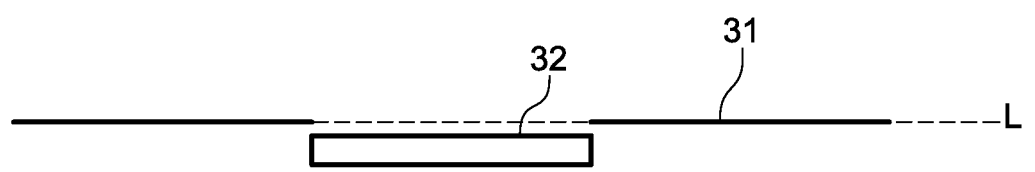

Referring to FIG. 3, in step S550, whether any two of the objects are under the first category, are different objects, and are co-planar is determined. When two objects are under the first category, are different objects and are co-planar, then step S560 is performed which displaces one of the two objects from the other until they are separate. When the two objects are not under the first category or do not have a thickness, or step S560 has been performed, then step S570 is performed. FIGS. 6A and 6B are schematic top views of two objects when steps S550 and S560 are performed on the two objects, respectively. For example, as shown in FIG. 6A, object 31 is a wall, and object 32 is a window. The object 32 is disposed in the object 31, and the objects 31, 32 are co-planar on plane L. When objects with different categories are co-planar, the software may mistakenly identify the two objects as the same, such that the software may wrongfully calculate an energy consumption estimation. Hence, under this circumstance, one of the two objects may be moved away from the other object in order to prevent a wrongful calculation. As shown in FIG. 6B, the object 32 (window) is moved with respect to the object 31 (wall) and the plane L such that the two objects 31, 32 are not overlapped. Although the above parallel movement may generate a gap between the two objects 31, 32, such gap does not substantially affect the energy consumption calculation. In this embodiment, the object 31 shown in FIGS. 6A and 6B has a thickness. In other embodiments of the present disclosure, the object 32 (window) may be adjusted in advance to become a plane (that is, not having a thickness) so that the calculation can be comparatively precise.

Figure 7A:
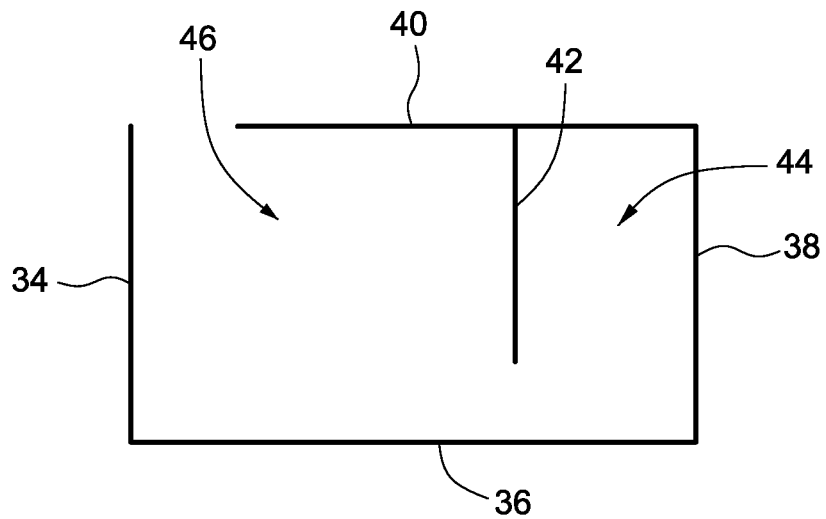
FIGS. 7A and 7B are schematic top views of multiple objects when steps S570 and S580 are performed on the multiple objects, respectively.
Figure 7B:
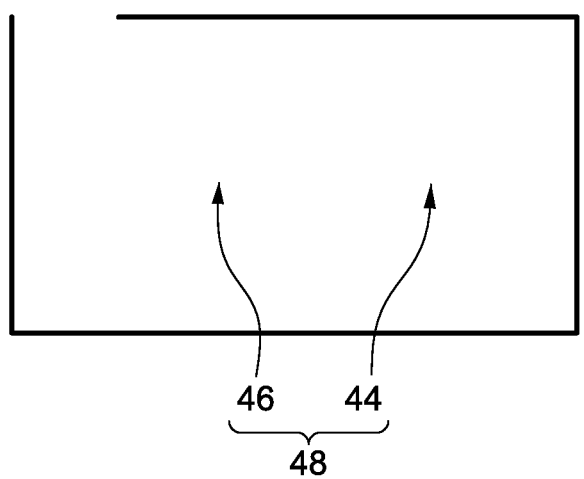

In step S570, it is determined whether the first space formed by at least a portion of the plurality of objects is a subordinate space of a second space. When it is determined that the first space is a subordinate space of the second space, then step S580 is performed, which incorporates the first space into the second space. When the first space is not a subordinate space of the second space (i.e., they are independent from each other), or step 560 has been performed, then step 600 is performed. FIGS. 7A and 7B are schematic top views of multiple objects when steps S570 and S580 are performed on the multiple objects, respectively. Referring to FIG. 7A, objects 34, 36, 38, 40, 42 are walls that together form first space 44 and second space 46. In one embodiment, the first space 44 may be a storage room, and the second space 46 may be an office room. In another embodiment, the first space 44 may be a walk-in closet, and the second space 46 may be a bedroom. In yet another embodiment, the first space 44 may be a conduit room or a pantry, and the second space 46 may be a kitchen. Generally, a storage room may be considered as a subordinate space of an office room, a walk-in closet may be considered as a subordinate space of a bedroom, and a conduit room or a pantry may be considered a subordinate space of a kitchen. Hence, if the two spaces are combined, it does not substantially affect energy consumption calculation and may simplify the calculation. Accordingly, as shown in FIGS. 7A and 7B, to facilitate the calculation, the object 42—which is considered a partition—is removed and the first space 44 is incorporated into the second space 46 so as to form a third space 48. In addition, attributes of the first space 44 and the second space 46 can be obtained or identified in accordance with step 200.

Next, in step S600, attributes of the first category of objects are defined. For example, the attributes may be defined by a user or by software. In one embodiment, step S600 further includes: exporting the building information modeling data to a first file in a second software, wherein the data format of the first file is different from that of the building information modeling data. In one embodiment, the second software is a three-dimensional modeling computer program, SketchUp of Trimble Navigation, Ltd. In this particular embodiment, step 600 may be performed in SketchUp. In one embodiment, the data format of the first file is gbXML (Green Building XML), which is exported to SketchUp. The format of gbXML is an industry supported standard format for storing and sharing building properties (attributes) between 3D Architectural and Engineering Analysis Software. Specifically, "room/space volume" of Revit (first software) can be used to export a file into SketchUp (second software). Moreover, the defined attribute in this embodiment is a heat transfer attribute. For example, the heat transfer attribute is light transmittance or heat conductance. A heat transfer attribute of the same category of objects may be separately defined, and in other embodiments, same heat transfer attribute of the same category of objects may be defined together at the same time. In addition, step S600 may also include: defining a building material attribute of objects, respectively. In another embodiment, an object that is perpendicular to a horizontal plane and has a thickness is automatically defined as a wall; another object that is parallel with the horizontal plane is defined as a bottom or top board (top or bottom plate). Hence, these separate defining steps facilitate and simplify the energy consumption estimation/calculation.

Figure 8:
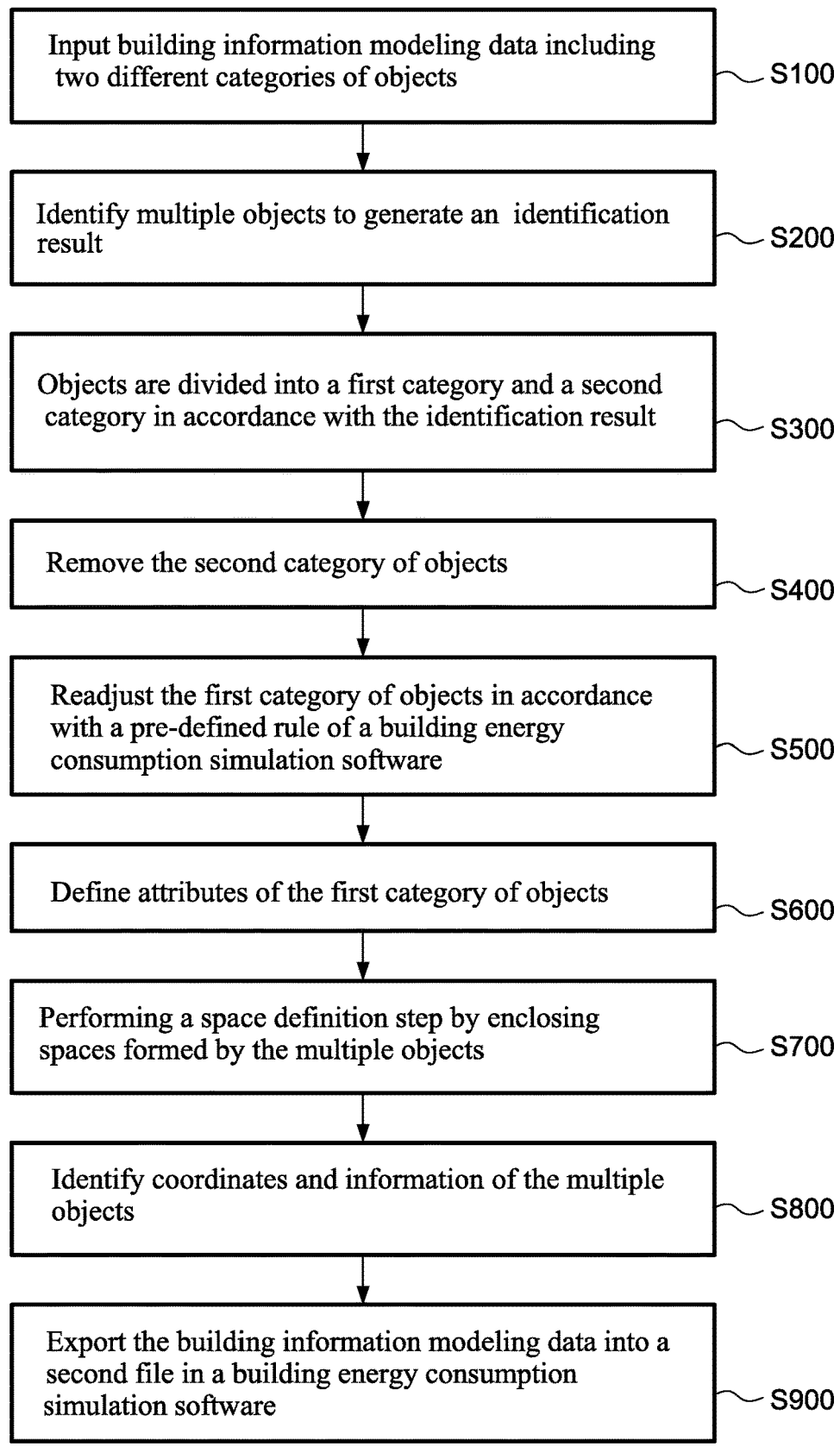
FIG. 8 is a flow chart showing the steps of a method for processing building information modeling data in accordance with a second embodiment of the present disclosure.
Figure 9:
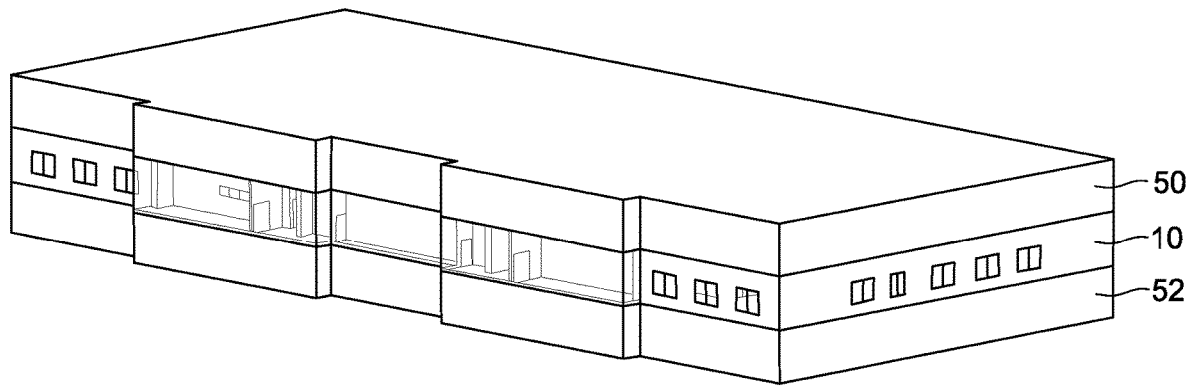
FIG. 9 is a schematic perspective view of a building information model when step S700 is performed on the building information modeling of FIG. 2.
Figure 11:
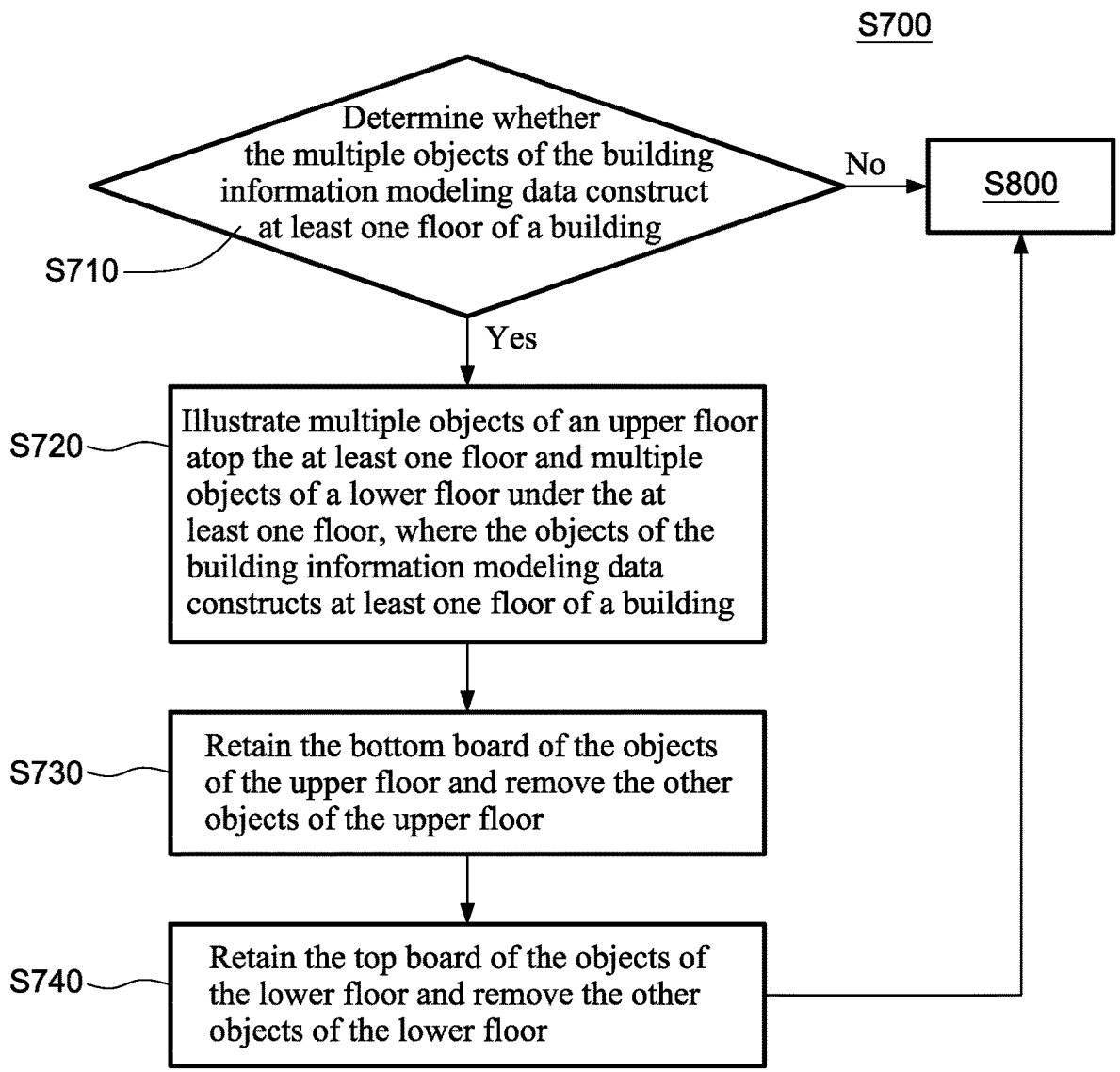
FIG. 11 is a flow chart showing the steps of defining a space for the method of processing building information modeling data in accordance with an embodiment of the present disclosure.

FIG. 8 is a flow chart of a method for processing building information modeling data in accordance with a second embodiment of the present disclosure. Compared with the method for processing building information modeling data shown in FIG. 1, the method for processing building information modeling data in this embodiment further includes: performing a space definition step S700 that encloses space formed by at least one of the multiple objects. In this embodiment, the space definition step S700 further includes the steps shown in FIG. 11: determining whether the multiple objects of the building information modeling data construct at least one floor of a building (step S710); illustrating multiple objects of an upper floor including a bottom board atop the at least one floor, and multiple objects of a lower floor including a top board under the at least one floor, provided that the multiple objects of the building information modeling data constructs at least one floor of a building (step S720); retaining the bottom board of the objects of the upper floor and removing the other objects of the upper floor (step S730); and retaining the top board of the objects of the lower floor and removing the other objects of the lower floor (step S740); performing step S800 shown in FIG. 8, provided that it is determined that the multiple objects of the building information modeling data do not construct at least one floor of a building, or provided that step S740 has been performed. FIG. 9 is a schematic perspective view of a building information model when step S700 is performed on a building information model of FIG. 2. As shown in FIG. 9, when the building information modeling data is not a single enclosed space, it may be difficult to calculate the volume of the building, and thus the estimation may not be accurately estimated. To this end, in addition to the floor 10, main objects of upper floor 50 (that is, objects forming the space of the floor 50) and main objects of lower floor 52 (that is, objects forming the space of the floor 52) are created. Then, the objects of the upper floor 50 and the lower floor 52 are removed except that the bottom board of the upper floor 50 and the top board of the lower floor 52 are retained (kept) to assure that the top and the bottom of the floor 10 are enclosed by the bottom board of the upper floor 50 and the top board of the lower floor 52.

Then, step S800 is performed in which the coordinates and information/data of the multiple objects are identified. In this step, the arranged coordinates and information/data of all objects are identified in the SketchUp program.

Figure 10:
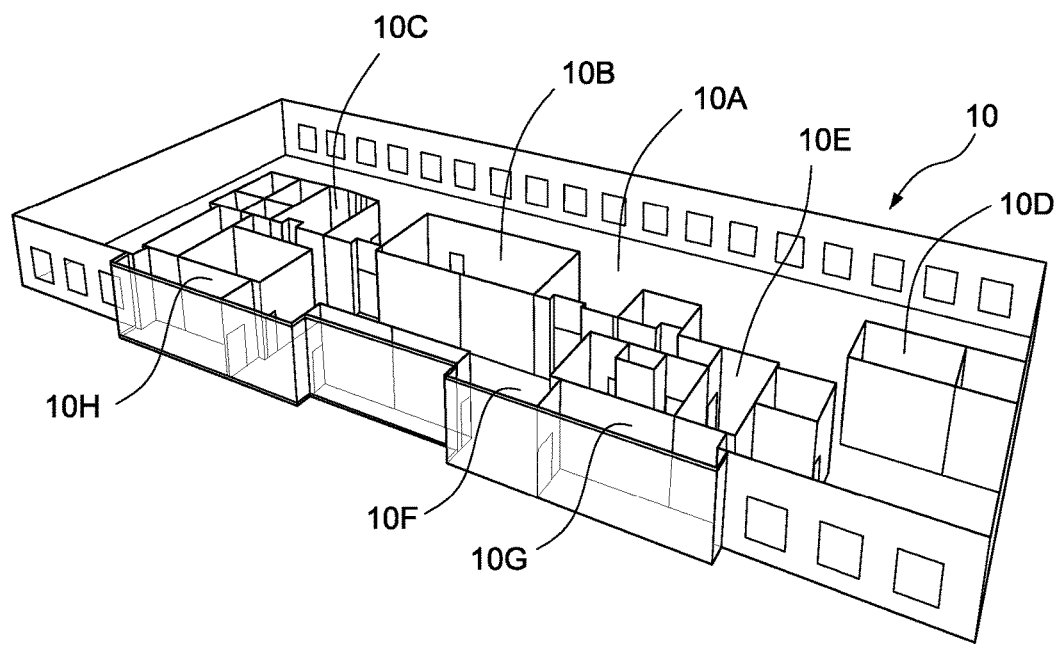
FIG. 10 is a schematic perspective view of a building information model of FIG. 2 that has been adjusted and is ready to be converted into building energy consumption simulation software.

Then, step S900 is performed; the building information modeling data is exported into a second file in building energy consumption simulation software, wherein the data format of the second file is different from that of the first file. FIG. 10 is a schematic perspective view of a building information model of FIG. 2 that has been adjusted and is ready to be converted into building energy consumption simulation software. As shown in FIG. 10, the objects of the floor 10 have been adjusted and identified, and the objects are ready to be exported into building energy consumption simulation software. In this embodiment, the building energy consumption simulation software is Building Energy Simulation Technology with Artificial Intelligence program (BESTAI) designed by Industrial Technology Research Institute (ITRI) in Taiwan. This program guides users to design or adjust building information modeling and provide on-line real-time building simulation analysis in order to obtain optimal energy consumption analysis and to provide users a customized analytical sheet. The analysis also includes Return On Investment (ROI), daily or monthly energy consumption analysis, and electrical bill analysis. Moreover, the file format may be IDF file format. In other embodiments of the present disclosure, other building energy consumption simulation software having functions similar to those of the BESTAI may also be adopted.

According to one aspect of the present disclosure, a method for processing building information modeling data includes the following steps: (1) inputting a building information model's data that includes two types of multiple objects; (2) identifying the objects to generate results of identification; (3) dividing the objects into a first category and a second category in accordance with the results of identification; (4) removing the second category of the objects; (5) readjusting the first category of objects in accordance with a predetermined rule provided in building energy simulation software; and (6) defining attributes of the first category of the objects.

In short, the present disclosure provides a method and a system for processing building information modeling data that exports building information modeling data into building energy consumption simulation software. Using the data, the building energy consumption simulation software calculates the energy consumption of the building information model. Generally speaking, file formats of a building information model used by general contractors are not compatible with or do not conform to the file formats of building energy consumption simulation software. The present disclosure therefore provides a method and a system for processing building information modeling data that can effectively use the data to correctly and efficiently set up or build up a building energy model.

Figure 12:
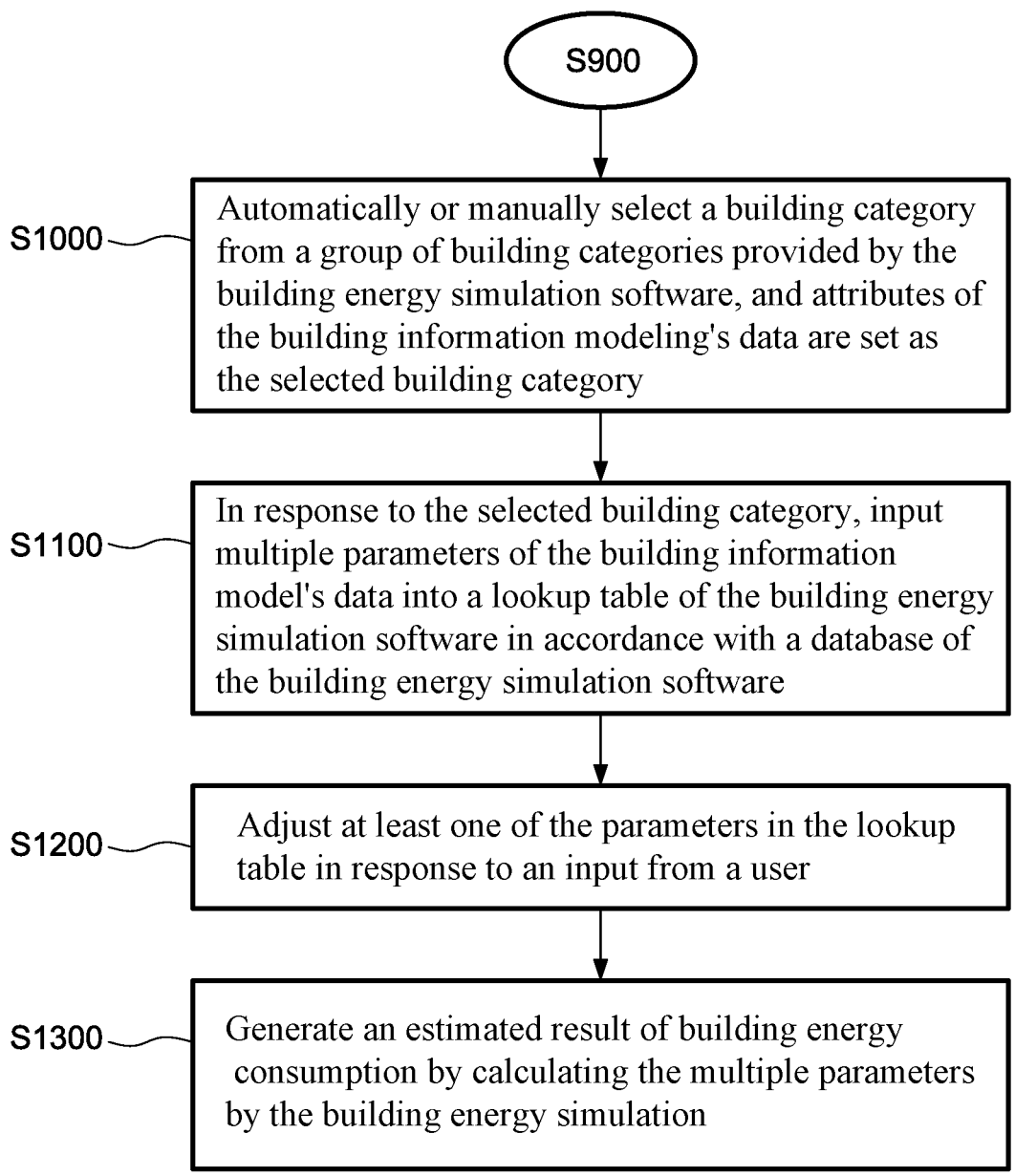
FIG. 12 is a flow chart showing the steps of a method for processing building energy information in accordance with an embodiment of the present disclosure.

FIG. 12 is a flow chart showing the steps of a method for processing building energy information in accordance with an embodiment of the present disclosure. Referring to FIG. 12, before the building information model is inputted into the building energy simulation software (step S900), coordinates of the building information model and other information and data are loaded into the building energy simulation software.

Then, step S1000 is performed. In step S1000, a building category is automatically or manually selected from a group of building categories provided by the building energy simulation software, and attributes of the building information modeling data are set as the selected building category. FIG. 10 is a schematic perspective view of a building information model of FIG. 2 that has been adjusted and is ready to be converted into building energy consumption simulation software, and FIG. 13 is a first lookup table used in a step of setting up a standard building model in accordance with the first embodiment of the present disclosure. As shown in FIGS. 10 and 13, in one embodiment, the building energy simulation software is configured to determine building categories of the building information model. For example, the building energy simulation software may determine the building category in accordance with certain information or data of the building information model, in order to set an attribute of the building information model's data according to the selected building category. In one embodiment of the present disclosure, a group of building categories provided by the building energy simulation software includes at least one of an office building, a high energy consumption factory, a low energy consumption factory, a shopping center, a school, a restaurant, a residential building and a complex building (for example, a complex including a combination of an office building and a shopping center, or a complex including a combination of a residential building and a shopping center). In another embodiment, the building energy simulation software may determine the building category in accordance with certain pre-existing data on the building information model. For example, If a building has multiple rooms (spaces), and the multiple rooms are named (defined) as multiple office rooms and multiple meeting rooms, respectively, then the building energy simulation software determines that the building information model is related to an office building. As shown in FIG. 13, when the building energy simulation software determines and selects that the building information model falls under a certain building category, the result of the determination/selection is displayed at block 600 (the selected building category is 'office building' in this embodiment). The second example is that if a building has multiple rooms (spaces) and the multiple rooms are named (defined) as multiple classrooms and multiple experiment rooms, respectively, then the building energy simulation software determines that the building information model is related to a school. The third example is that if a building has multiple rooms (spaces) and the multiple rooms are named (defined) as multiple manufacturing rooms and multiple storage rooms, then the building energy simulation software determines that the building information model is related to a high energy consumption factory.

In another embodiment, a user may manually select a building category. For example, the block 600 shown in FIG. 13 provides multiple options (namely, a group of building categories) for a user to select. For example, the options include the aforementioned office building, high energy consumption factory, low energy consumption factory, shopping center, school, restaurant, residential building and building complex. When the user selects one option (namely, selecting a building category, such as an office building), an attribute of the building information modeling data is set according to the selected building category.

Then, in step S1100, in response to the selected building category, multiple parameters of the building information modeling data are inputted into a lookup table of the building energy simulation software in accordance with a database of said software. In this embodiment, the building energy simulation software downloads multiple subordinate building categories from the database in response to the selected building category, and the software then downloads predetermined (pre-set) values corresponding to the respective subordinate building categories, or the user manually inputs values corresponding to the respective subordinate building category.

For example, a floor (storey) 10 of a building shown in FIG. 10 has multiple spaces (rooms), such as spaces 10A to 10H. The building energy simulation software is configured to divide the spaces into different types based on functions of the spaces 10A to 10H, for example, office room 602, meeting room 604, lobby 606, hall way 608 and/or others 610 (for example, stairs, restrooms or outdoor balcony). Next, the building energy simulation software is configured to, in accordance with the selected building category, input multiple parameters of the building information modeling data into the aforementioned blocks corresponding to types 602, 604, 606, 608, 610. In other words, in accordance with the selected building category, the multiple subordinate building categories are provided by the building energy simulation software, and in accordance with the building information modeling data, volume ratio, personnel density, lighting density and/or equipment density of the building information model—corresponding to the subordinate building categories—are downloaded from the database of the building energy simulation software. In one embodiment, the block 602 (the subordinate building category) is an office room, the blocks 602a, 602b, 602c (the parameters of the subordinate building category) are personnel density (square meter per person, m2/person), lighting density (Watt per square meter, W/m2; or lux) and equipment density (Watt per square meter, W/m2), respectively. In this embodiment, the building energy simulation software includes a database that includes predetermined heat transfer attributes of each subordinate building category (office room, meeting room, lobby, hall way and/or others). The greater the personnel density (m2/person) is (meaning that each person or worker occupies more space), the less heat per unit is generated. The greater the lighting density (W/m2) is (meaning that illumination is greater), the greater the consumption of electricity. The greater the equipment density (m2/person) is (meaning that the space has more electronic devices), the less heat per unit is generated. These attributes are based on predetermined values resulting from historic data and events stored in the database. For example, type 602 (subordinate building category) is related to an office room, the values of the blocks 602a, 602b, 602c (parameters) respectively are 5, 20 and 25. Type 604 is related to a meeting room, the values of its blocks 604a, 604b, 604c respectively are 2.5, 20 and 10. That being said, in a single space unit according to this embodiment, the pre-set meeting rooms have more people than the office room, and the meeting rooms have less equipment than the office room.

In one embodiment, the types that are related to a high energy consumption factory (for example conventional industrial factory or semiconductor factory) include manufacturing room(s), storage room(s) and office room(s). In one embodiment, the types that are related to a low energy consumption factory (for example pharmaceutical or biotechnical factory) include manufacturing room(s), research and development room(s), storage room(s) and office room(s). The types that are related to a restaurant include dining room(s), kitchen(s) and a lobby.

In sum, when the building energy simulation software determines the selected building category, said software may input the parameters into the lookup table (for example, as shown in FIG. 13) according to the database.

In step S1200, as shown in FIG. 12 and in other embodiments, the building energy simulation software is configured to adjust at least one of the parameters in the lookup table in response to an input from a user. In other words, a user may define or adjust any parameter according to actual conditions. For example, as shown in FIG. 13, a user may manually adjust the value of a block (a parameter of the subordinate building category, personnel density) of the type 602 from 5 to 10.

As shown in FIG. 14—which is a second lookup table used in the step of setting up a standard building model in accordance with the first embodiment of the present disclosure—the building energy simulation software is configured to automatically define categories of at least one room, respectively, according to the building information modeling data. Specifically, when the building information modeling data includes information about at least one room (space), and the building energy simulation software identifies that the floor 10 of the building as shown in FIG. 10 has multiple rooms 10A to 10H, the building energy simulation software is configured to display blocks 622 to 636 which represent space names and blocks 638 to 652; and these represent space types that are originally defined by the building information modeling data. That is, in response to the selected building category, the building energy simulation software provides multiple subordinate building categories in the lookup table. For example, blocks 622 to 636, which represent space names, are spaces 10A to 10H originally defined by the building information modeling data. The blocks 638 to 652, which represent different types of space (subordinate building categories), respectively, are: an office room, a meeting room, a meeting room, an office room, an office room, a lobby, a restroom and stairs that are originally defined by the building information modeling data.

In one embodiment, according to the building information modeling data, a user may manually define a type of at least one room. That is, a user may also define or adjust the blocks 622 to 636 which represent the names of each space and the blocks 638 to 652 which represent subordinate building categories (types of space). For example, a user may manually adjust the block 638—which represents the subordinate building category—to "office room." Thus, after setting the blocks 622 to 636 which represent names of each space, and the blocks 638 to 652 which represent corresponding subordinate building categories, the parameters of the subordinate building categories correspond to the values shown in blocks 602a, 602b, 602c, 604a, 604b, 604c in the lookup table of FIG. 13. For example, if the space 10A is an office room, according to blocks 602a, 602b, 602c, the personnel density, the lighting density and the equipment density are 5, 20, 25, respectively. That is, the parameters include personnel density, lighting density, and/or equipment density corresponding to each of at least one space (room), and the information/data of at least one room include numbering of the at least one room.

Figure 15:
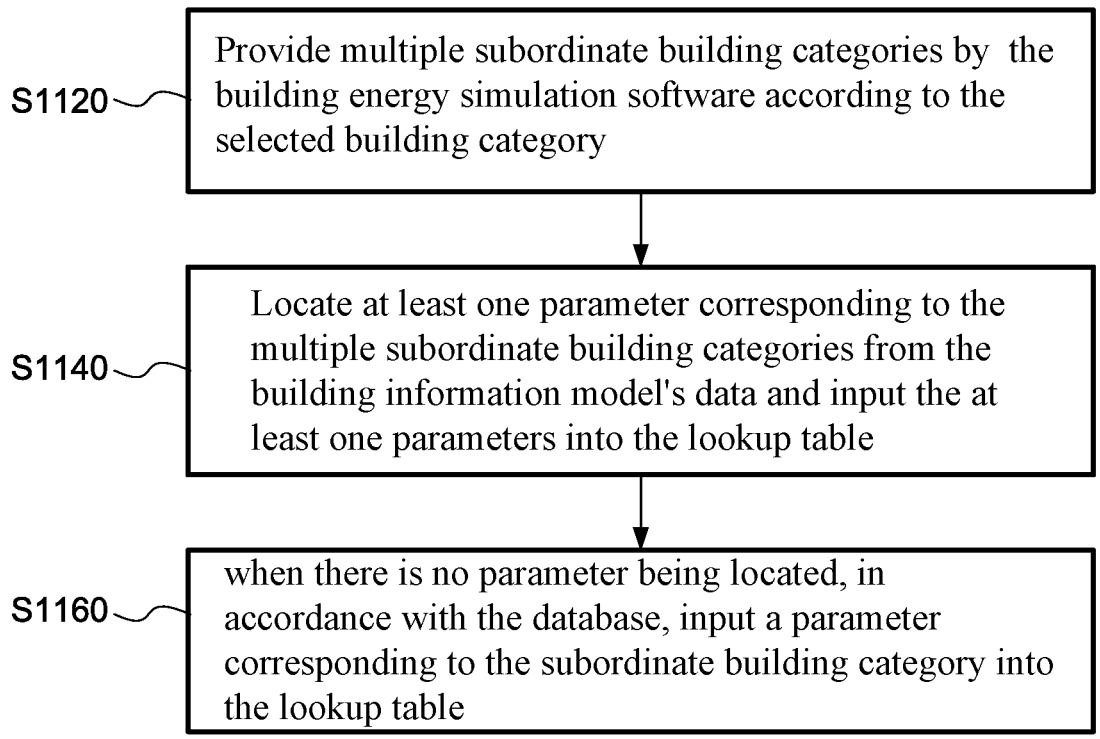
FIG. 15 is a flow chart showing the step of inputting multiple parameters of the building information modeling data into the lookup table of the building energy simulation software in response to the selection result of the building categories.

FIG. 15 is a flow chart showing the steps of inputting multiple parameters of the building information modeling data into the lookup table of the building energy simulation software in response to the selection result of the building categories. In this embodiment, in response to the selected building category, the step S1100 of inputting multiple parameters of the building information modeling data into the lookup table of building energy simulation software includes: performing step S1120 that provides multiple subordinate building categories from the building energy simulation software according to the selected building category; performing step S1140 that locates at least one parameter corresponding to the multiple subordinate building categories from the building information modeling data and inputs the at least one parameter into the lookup table; performing step S1160 so that when there is no parameter being located—in accordance with the database—a parameter is inputted into the lookup table which corresponds to the subordinate building category. That is, if the building information modeling already has at least one parameter of the subordinate building category, the building energy simulation software is configured to keep the at least one parameter and not to replace the at least one parameter with data in the database. Referring to FIG. 16, for example, if the data of the building information modeling already designates the space 10B shown in FIG. 10 as an office room, and the personnel density is 10, then the building energy simulation software identifies and keeps the data and displays them in the lookup table. As to other parameters not included in the lookup table of the building information model, the building energy simulation software may still download into the lookup table such parameters from the database. Next, a user may still manually adjust or re-define the parameters in step S1200.

FIG. 16 is a third lookup table used in the step of setting up a standard building model in accordance with a second embodiment of the present disclosure. In other embodiments, if a building information model which is inputted into the building energy simulation software has an exterior wall and does not have any partition walls that form any room inside the building, steps S1000 and S1100 can still be performed. Specifically, The main differences between the present embodiment and the embodiments shown in FIGS. 13 and 14 lie in that: after the building category (for example, office building) is identified or determined, the lookup table displays a predetermined volume ratio (percentage), personnel density and equipment density of each subordinate building category. In this embodiment, according to the estimated results from previous research and experience, blocks 664 to 672 correspond to the subordinate building categories: office room 654, meeting room 656, lobby 658, hallway 660, others 662, show 60%, 10%, 5%, 10% and 15%, respectively. Then, in step S1100, for example, a user may adjust the blocks 664 and 666 which represent the volume ratios of the office room and the meeting room, respectively, to 50% and 20%.

In addition to the aforementioned parameters, in this embodiment, parameters may include, but not be limited to, a building name, number of floors, orientations, a building length, a building width, a building height, a visible transmittance (VT) of an object (such as a window), a solar heat gain coefficient (SHGC) of an object (such as a window), an outdoor lighting schedule, an air-conditioning schedule and a temperature, and/or a geographical location.

In one embodiment, the number of floors, an orientation, a building length, a building width and a building height are downloaded from the database of the building information model. Furthermore, a user may manually define the number of floors, an orientation, a building length, a building width and a building height of the building information model.

Referring to FIG. 17, which is a fourth lookup table used in the step of setting up a standard building model in accordance with the second embodiment of the present disclosure, blocks of the lookup table may display multiple parameters, including a rate of heat transfer of an object, a Visible Transmittance of a window, and a Solar Heat Gain Coefficient of a window. Specifically, a rate of heat transfer ($W/m^2$-K, i.e., U value) of objects may be rates of heat transfers of a roof, an exterior wall and a window shown in blocks 674, 676 and 678; block 680 represents a Visible Transmittance of a window, ranging from 0 to 0.99; block 682 represents Solar Heat Gain Coefficient of a window, ranging from 0 to 0.99. If the building information model already has the aforementioned parameters, then the building energy simulation software is able to directly display those parameters. On the contrary, if the data of the building information model does not have the aforementioned parameters, the building energy simulation software is configured to download the parameters from the database. Next, a user may directly and manually define or adjust the parameters by selecting (clicking) blocks 694 to 698. In this embodiment, the database of the building energy simulation software also includes information or data of Design Specifications of Building Technical Regulations (for example, the regulations in Taiwan) and design specifications of American Society of Heating, Refrigerating and Air-Conditioning Engineers (ASHRAE). A user may directly select blocks 684 to 692 to load related data from the database.

Figure 18:
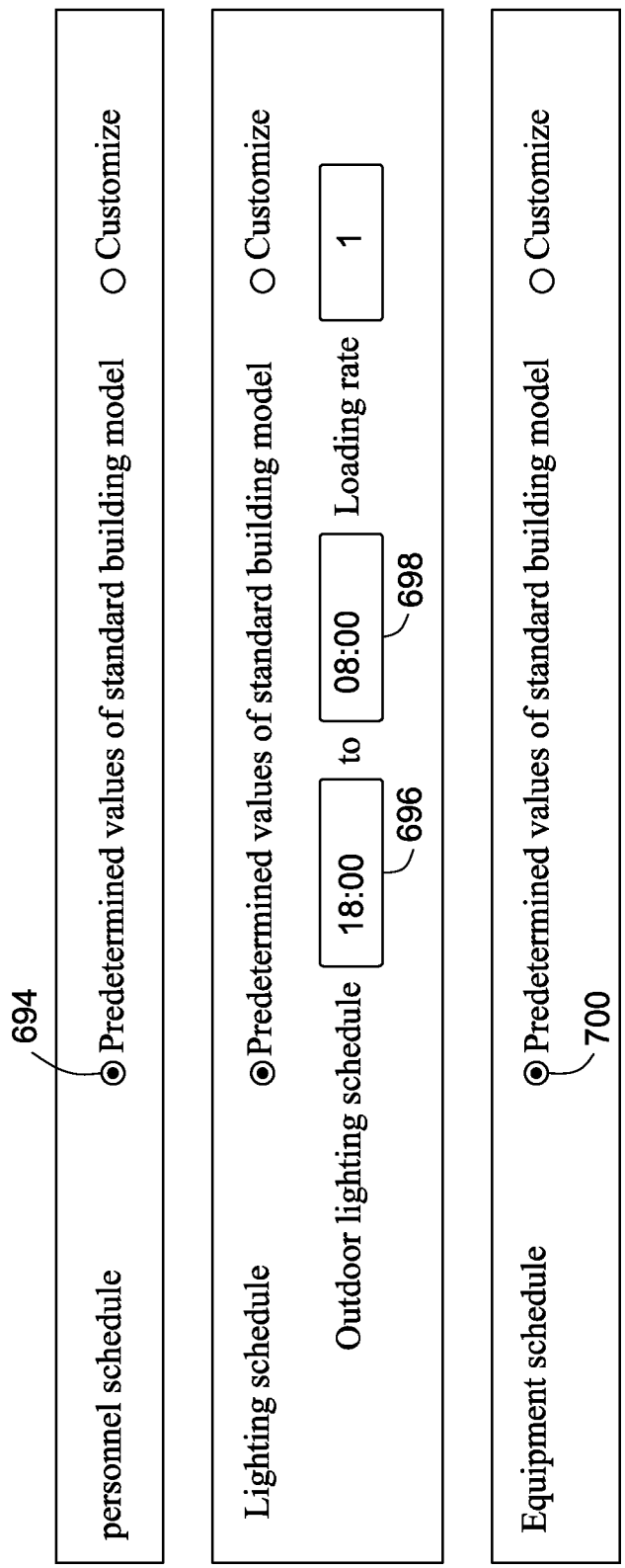
FIG. 18 is a fifth lookup table used in the step of setting up a standard building model in accordance with the second embodiment of the present disclosure.

Referring to FIG. 18, which is a fifth lookup table used in the step of setting up a standard building model in accordance with the second embodiment of the present disclosure, at this moment, a personnel schedule, an outdoor lighting schedule and an equipment schedule shown in blocks 694 to 700 of the lookup table may be adjusted. In detail, the term "personnel schedule" refers to ratios of personnel working in different time periods of usual work days. For example, the predetermined values of the personnel schedule from the database are 100% from 9 am to 6 pm (that is, all workers are working from 9 am to 6 pm), the predetermined values are 10% from 6 pm to 9 pm (that is, only 10 percent of the workers are working from 6 pm to 9 pm), and the other periods are 0%. The term "outdoor lighting schedule" refers to a schedule indicating whether outdoor lighting is turned on or off. For example, the predetermined values from the database are 1 from 6 pm to 8 am (when the lighting is turned on), and other periods are 0 (when the lighting is turned off). The term "equipment schedule" refers to a schedule indicating whether general electronic devices are turned on (i.e., in operation). For example, if the building is an automation factory, the values may be 1 all day every day, which means all devices are operated uninterruptedly. If the building is an office building, the equipment schedule may be similar to the personnel schedule. For example, the predetermined values from the database are 100% from 9 am to 6 pm, the predetermined values are 20% from 6 pm to 9 pm, and the rest of time periods are 5%. Accordingly, users may manually adjust the personnel schedule, lighting schedule and equipment schedule by themselves.

Figure 19:
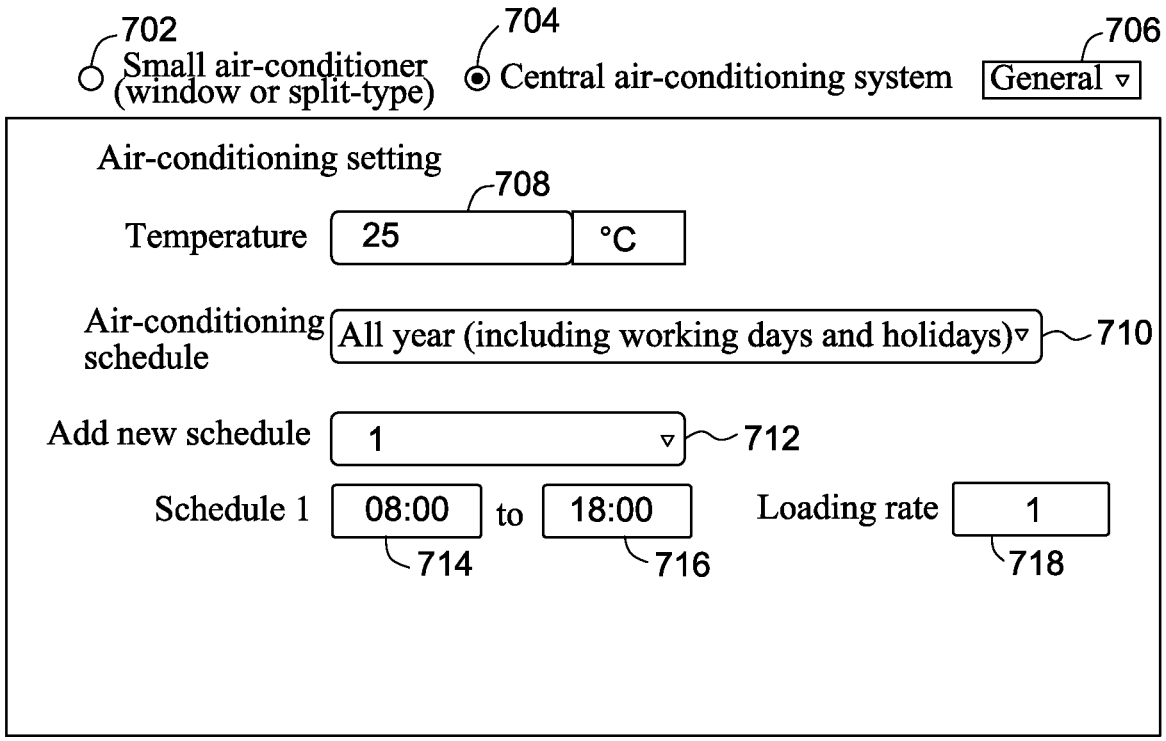
FIG. 19 is a sixth lookup table used in the step of setting up a standard building model in accordance with the second embodiment of the present disclosure.

Referring to FIG. 19, which is a sixth lookup table used in the step of setting up a standard building model in accordance with the second embodiment of the present disclosure, the sixth lookup table includes settings of air-conditioning, as shown in blocks 702 to 716. In detail, the settings include types of the air-conditioning system, the temperature control, the schedule and other detailed parameters. First, the blocks 702 and 704 show types of air-conditioning system, such as small air-conditioner (window air-conditioner or split-type air-conditioner) or central air-conditioning system. Different types of central air-conditioning systems can be selected and shown in Block 706. Temperature is shown in block 708 (for example, the predetermined value is 25 Celsius degrees). Blocks 710 to 712 represent the air-conditioning schedule and adding a new schedule, which may be similar to the aforementioned personnel schedule or equipment schedule. For example, in blocks 714 to 716, the air-conditioning can be set to turn on from 8 am to 6 pm, and the rest of the time periods can be set to turn off (for example, the value "1" shown in block 718 means turned on and the value "0" means turned off).

Figure 20:
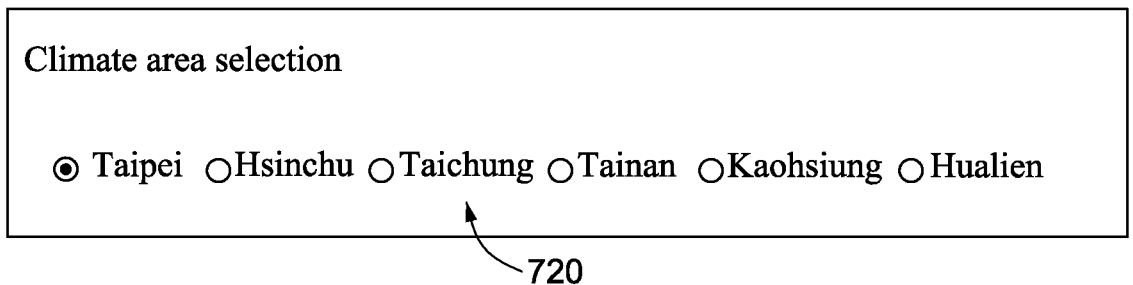
FIG. 20 is a seventh lookup table used in the step of setting up a standard building model in accordance with the second embodiment of the present disclosure.

Referring to FIG. 20, which is a seventh lookup table used in the step of setting up a standard building model in accordance with the second embodiment of the present disclosure, the block of the lookup table shown in FIG. 20 may display a geographical location of a building in order to take the climate around the building into account. For example, the block 720 may include six main cities of Taiwan, such as Taipei, Hsinchu, Taichung, Tainan, Kaohsiung, and Hualien for a user to select. In other embodiments, the lookup table may include data or information regarding cities of other countries/territories.

Figure 21:
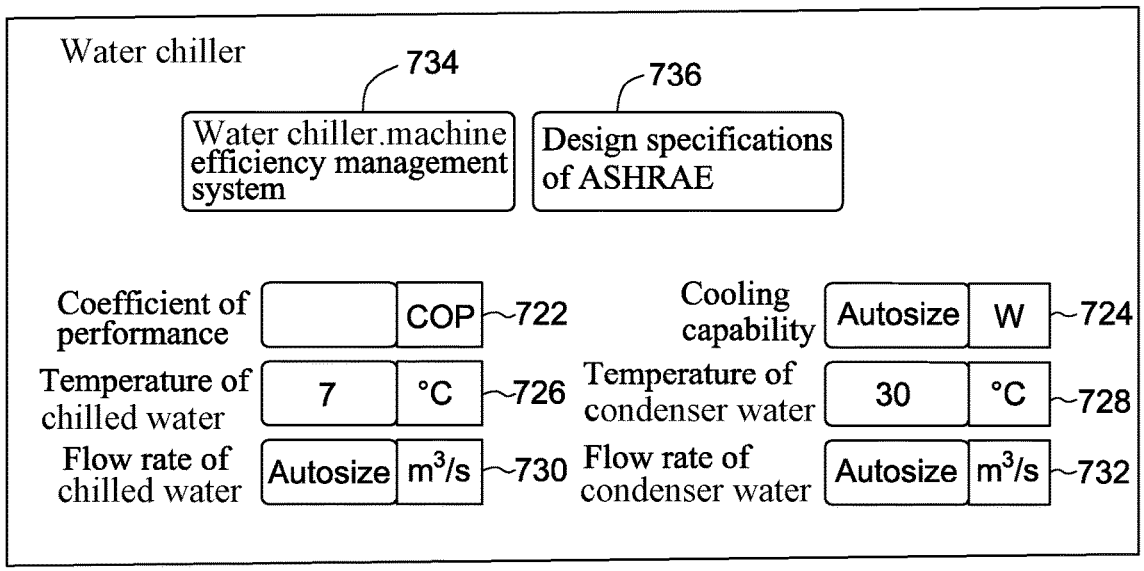
FIG. 21 is an eighth lookup table used in the step of setting up a standard building model in accordance with the second embodiment of the present disclosure.

Moreover, the lookup table of the building energy simulation software may also include other detailed parameters of the air-conditioning system, as shown in FIG. 21, which is an eighth lookup table used in the step of setting up a standard building model in accordance with the second embodiment of the present disclosure. When the type of the air-conditioning system as shown in FIG. 18 is a central air-conditioning system, blocks 722 to 732 of the lookup table may also include coefficient of performance (COP), cooling capability (watt, W), temperature of chilled water (Celsius degrees), flow rate of chilled water (cubic meters per second, $m^3/s$), temperature of condenser water (Celsius degrees), flow rate of condenser water ($m^3/s$). When the data of the building information model has no related parameters, the building energy simulation software generally downloads predetermined values of "chiller efficiency management system" from the database, and a user may select (click) block 734 to manually adjust or define the parameter, or select (click) block 736 to manually select the data of "design specifications of ASHRAE." In addition, the database also includes data regarding other types or brands of a water chiller. The building energy simulation software is configured to identify the current water chiller. Alternatively, a user may manually select the correct water chiller.

Figure 22A:
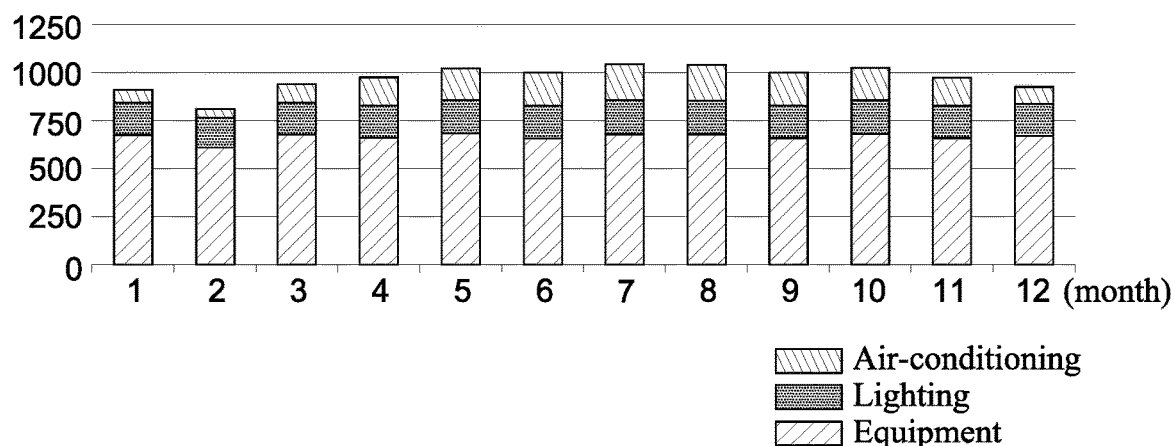
FIG. 22A is a first analytic diagram of a result of an estimation in accordance with an embodiment of the present disclosure.

Next, as shown in FIG. 12, in step S1300, the building energy simulation software calculates the multiple parameters to generate an estimated result of building energy consumption. In detail, referring to FIG. 22A, which is a first analytic diagram of a result of an estimation in accordance with an embodiment of the present disclosure, the building energy simulation software displays a diagram which shows energy consumption of the building for each month. Three sections of each column represent the portion of air-conditioning, lighting and equipment, respectively. A user may note the ratios (proportions) of them. In other embodiments, the diagram may display detailed monthly estimations of energy consumption of cooling (and/or heating), outdoor lighting, interior lighting, an interior piece of equipment, an exterior piece of equipment, a fan, a pump, a cooling tower, a moisturizing system, a heat recycling system, a water supply system, a cooling/freezing system and a power generator.

Figure 22B:
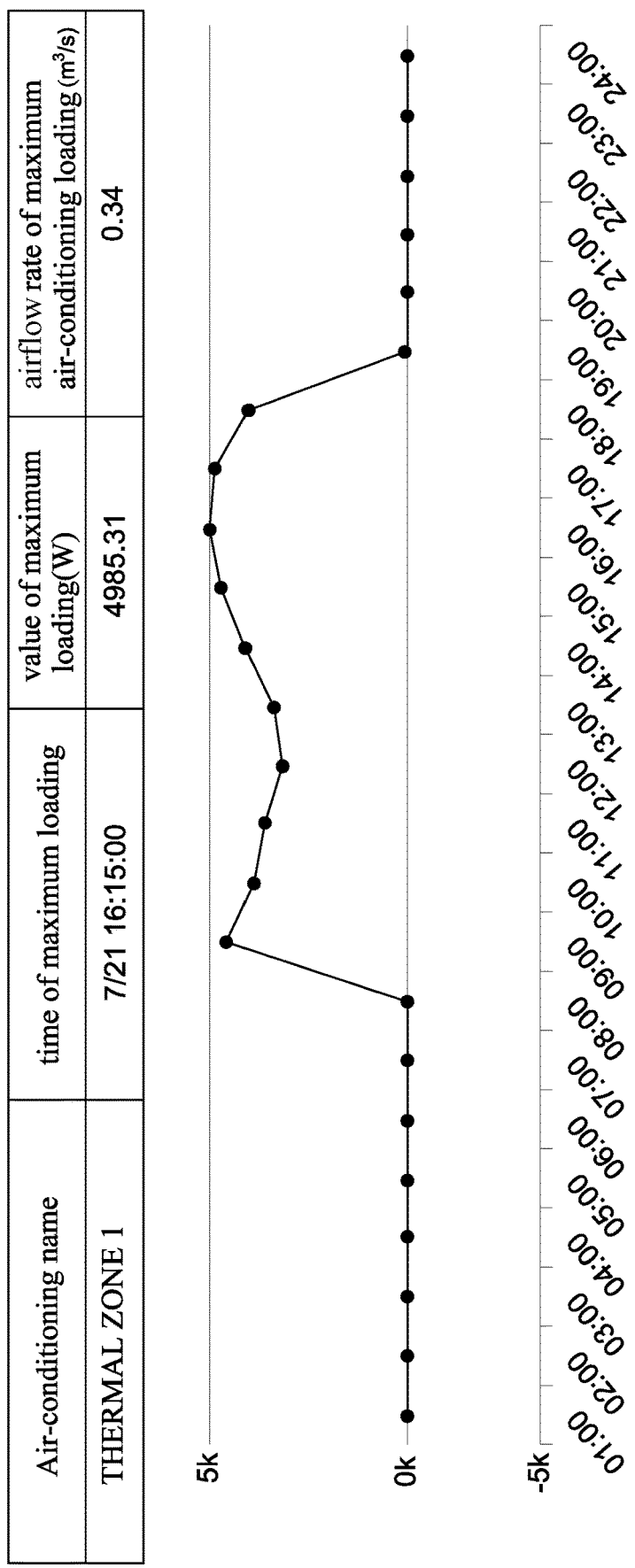
FIG. 22B is a second analytic diagram of a result of an estimation in accordance with an embodiment of the present disclosure.

FIG. 22B, which is a second analytic diagram of a result of an estimation in accordance with an embodiment of the present disclosure, displays estimations of hourly maximum air-conditioning loading. The above chart includes estimations of maximum loading in each period, the value of maximum loading and the flow rate of maximum air-conditioning loading.

FIG. 22C is a third analytic diagram of a result of an estimation in accordance with an embodiment of the present disclosure. The left side of FIG. 22C shows an estimation of energy consumption of a standard building, and the right side of FIG. 22C shows an estimation of energy consumption of an improved building. The fourth section of each pie chart includes the proportions of energy consumption of air-conditioning, lighting, equipment and others. These comparisons between the data of the building information model and a standard building can be further provided to estimate improvement analysis and return on investment (ROI), and CO2 emissions can be further calculated.

Figure 23:
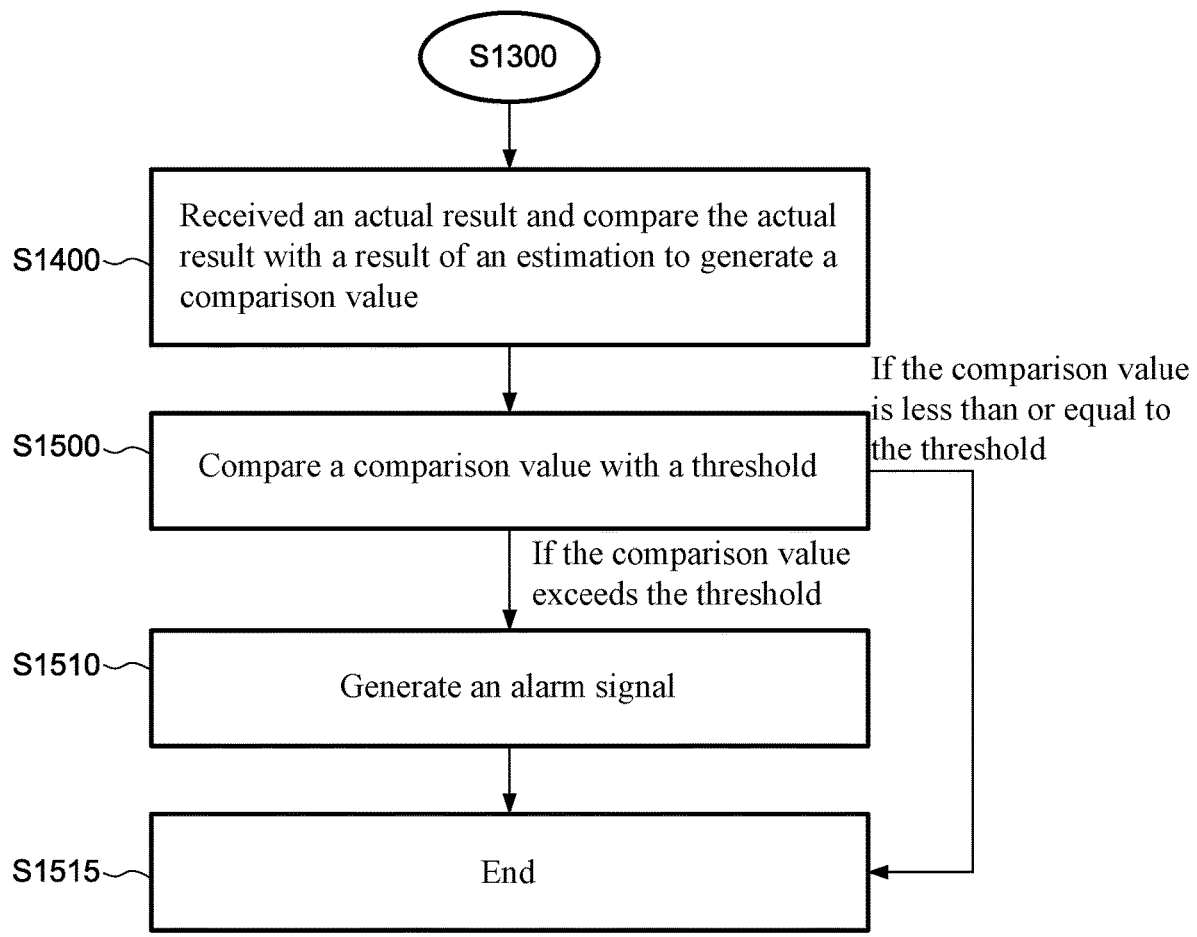
FIG. 23 is a flow chart showing the steps of comparing a result of an estimation with an actual result in accordance with an embodiment of the present disclosure.

Furthermore, the building energy simulation software of the present disclosure is configured to compare a result of an estimation with an actual result. FIG. 23 is a flow chart showing the steps of comparing a result of an estimation with an actual result in accordance with an embodiment of the present disclosure. As shown in FIG. 23, in step S1400, an actual result of energy consumption is received and is compared with a result of an estimation to generate a comparison value. Then, in step S1500, the comparison value is compared with a threshold. If the comparison value exceeds the threshold, then step S1510 is performed that transmits an alarm signal to a user. If the comparison value is less than or equal to the threshold, then step S1515 is performed, meaning the software does not transmit any alarm signal and the process is finished. For example, an estimation of total energy consumption in January is 913 kWh, and the actual result is 1050 kWh, and the threshold is 100 kWh. The building energy simulation software is configured to compare the estimation with the actual result, and the difference is 137 kWh (this is, comparison value, 1050 kWh minus 913 kWh), which exceeds the threshold (100 kWh). Since the comparison value exceeds the threshold, the building energy simulation software is configured to transmit an alarm signal to a user. If the estimation of total energy consumption in January is 913 kWh, and the actual result is 980 kWh, then the comparison value is 67, which is less than the threshold (100). Since the comparison value is less than the threshold, which means that the two values are quite similar, the building energy simulation software does not transmit any alarm signal and the process is finished.

Figure 24:
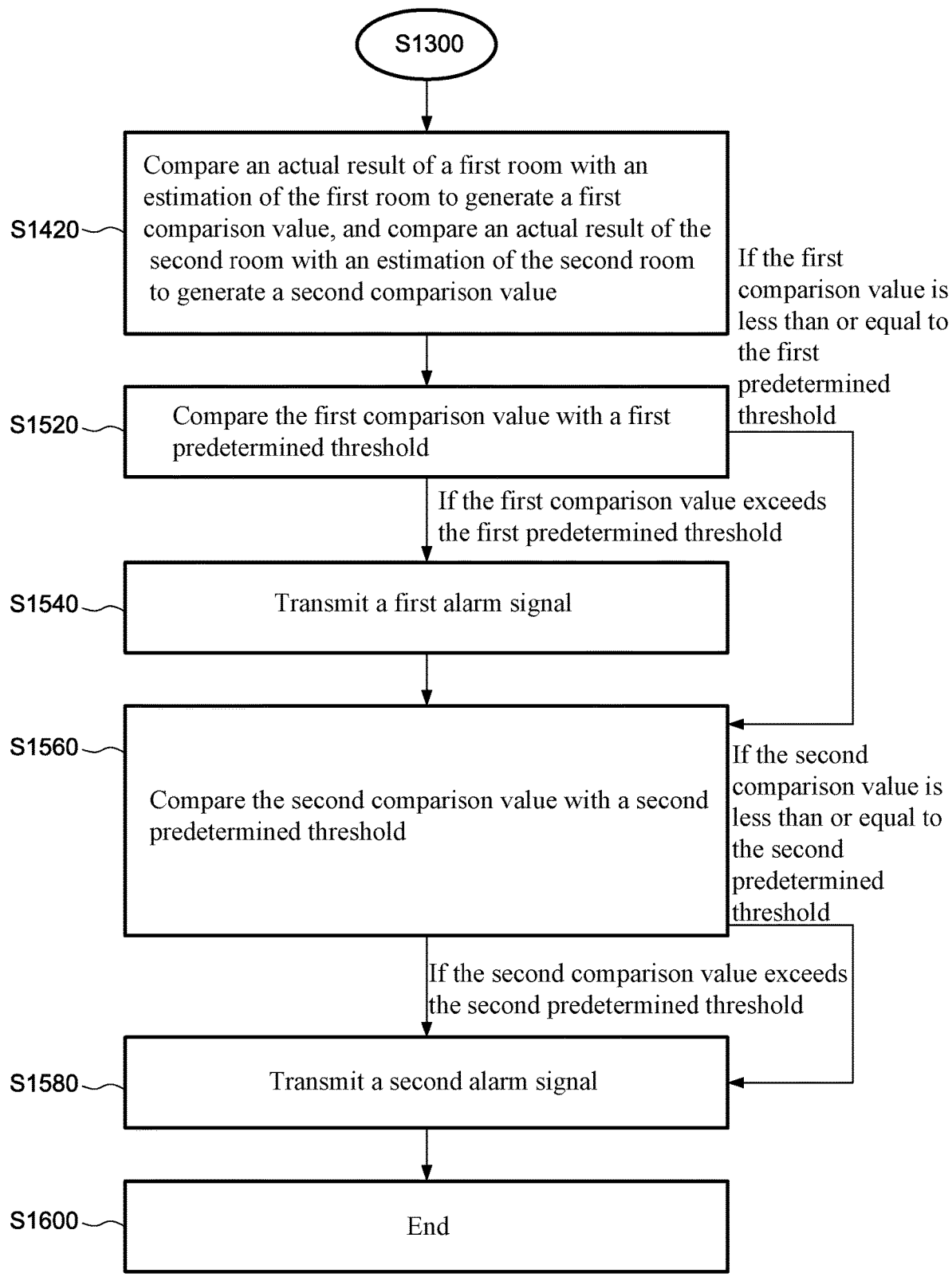
FIG. 24 is a flow chart showing the steps of comparing a result of an estimation with an actual result in accordance with another embodiment of the present disclosure.

As shown in FIG. 24, which is a flow chart showing the steps of comparing a result of an estimation with an actual result in accordance with another embodiment of the present disclosure; in a further embodiment, an estimation result of energy consumption of a building includes an estimation of a first room and an estimation of a second room. The actual result of energy consumption includes actual results of a first room and of a second room. The step of comparing the actual result with the estimation of the building energy consumption includes the following steps. In step S1420, the actual result of the first room is compared with the estimation of the first room to generate a first comparison value, and the actual result of the second room is compared with the estimation of the second room to generate a second comparison value. The predetermined threshold includes a first predetermined threshold and a second predetermined threshold. Then in step S1520, the first comparison value is compared with the first predetermined threshold. In step S1540, if the first comparison value exceeds the first predetermined threshold, a first alarm signal transmitted. If the first comparison value is less than or equal to the first predetermined threshold, a first alarm signal is not generated and step S1560 is performed, which compares the second comparison value with a second predetermined threshold. In S1580, if the second comparison value exceeds the second predetermined threshold, a second alarm signal transmitted. In step S1600, if the second comparison value is less than or equal to the second predetermined threshold, a second alarm signal is not generated, and the process is finished.

For example, the first room and the second room described in FIG. 24 are spaces 10A and 10B shown in FIG. 10. A result of an estimation of the first room and a result of an estimation of the second room are both 100 kWh, and the actual result of the first room and the actual result of the second room are 82 kWh and 115 kWh. The first threshold and the second threshold are both 10 kWh. After calculation, it can be determined that the first comparison value is 18 kWh and the second comparison value is 15 kWh. Since the first comparison value and the second comparison value exceed the first threshold and the second threshold, respectively, the building energy simulation software transmits a first alarm signal and a second alarm signal to a user. After receiving the two alarm signals, the user may conduct some studies to know the reasons why the comparison value exceeds the threshold. For example, if the difference of the two results is positive (i.e., greater than zero), the user may check whether any air conditioner or electronic devices (equipment) consume more energy than expected. If the difference of the two results is negative (i.e., less than zero), the user may check whether there is something out of order. As such, energy consumptions of different rooms or spaces can be compared (even comparisons between estimations and actual results of lighting, air-conditioning or equipment of each room/space) to further lay out energy consumption plans for each room or space.

According to another aspect of the present disclosure, a system for processing building energy information includes: a non-transitory computer-readable storage medium comprising computer-readable instructions and one or more processors configured to receive the computer-readable instructions to perform: (1) inputting building information modeling information into building energy simulation software; (2) automatically selecting a building category or manually selecting a building category from a group of building categories provided by the building energy simulation software; (3) in response to the selected building category, inputting multiple parameters into a lookup table of the building energy simulation software in accordance with a database of the building energy simulation software; and (4) generating an estimation of a building's energy consumption through a calculation by the building energy simulation software based on the parameters.

In sum, according to a method and a system for processing building energy information of the present disclosure, the building energy simulation software is configured automatically from a group of building categories provided in the database of the software in accordance with the database of the building information model or manually select a building category. Attributes of the data of the building information model are set according to the selected building category. In the database stored in the building energy simulation software, multiple parameters of the data of the building information model are inputted into a lookup table for later calculation. Therefore, using the database of the building energy simulation software, the building energy simulation software provides multiple predetermined values for multiple parameters of the building information model, thereby correctly and efficiently estimating the energy consumption of the building.

In addition, in some other embodiments, the building energy simulation software can also compare a result of an estimation with an actual result. If the difference is unexpectedly high, an alarm signal is transmitted to a user so that he/she can analyze the problem creating the significant difference between the two results. Accordingly, the estimation of energy consumption can be improved and the actual energy consumption of the building can be reduced or optimized.

The terminology used in the description of the present disclosure is for the purpose of describing particular embodiments only, and is not intended to limit the disclosure. As used in the description of the disclosure and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items.

It shall be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The use of directional adjectives "above, "under," "upper," "lower," "below," "left," "right," "up," "down," "top," "bottom," "vertical," "horizontal," and like terms, are meant to assist with understanding relative relationships among design elements and should not be construed as meaning an absolute direction in space nor regarded as limiting. For example, in some embodiments, "a first component is on a second component" describes the first component being on the second component (the first component is directly on the second component), while some other components are between the first and second components.

Terms such as "approximately," "substantially," or "about" are applied to describe a small variation of a structural unit of an apparatus. When a term is used in conjunction with another term to describe a particular characteristic of the claimed disclosure, such term can indicate the exact events or circumstances, and similar exact events or circumstances.

Obviously, numerous modifications and variations of the present disclosure are possible in light of the above teachings. It is therefore to be understood that within the scope of the appended claims, the present disclosure may be practiced otherwise than as specifically described herein.

What is claimed:

1. A method for processing building energy information, the method comprising:
    inputting data of a building information model that includes a plurality of objects;
    identifying the plurality of objects to generate results of identification;
    dividing the plurality of objects into a first category and a second category in accordance with the results of identification;
    removing the second category of objects;
    readjusting the first category of objects in accordance with a predetermined rule of the building energy simulation software;
    defining attributes of the first category of objects;
    inputting the data of the building information model into building energy simulation software;
    automatically selecting a building category or manually selecting a building category from a group of building categories provided by the building energy simulation software;
    in response to the selected building category, inputting a plurality of parameters into a lookup table of the building energy simulation software in accordance with a database of the building energy simulation software; and
    generating an estimation of a building's energy consumption through a calculation by the building energy simulation software based on the parameters;
    wherein the step of readjusting the first category of objects further comprises:
    determining whether an object of the plurality of objects is under the first category and whether the object has an irregular surface; and
    planarizing the object where the object is under the first category and has the irregular surface.

2. The method of claim 1, further comprising:
    adjusting at least one of the parameters of the lookup table according to an input from a user.

3. The method of claim 1, wherein the group of building categories provided by the building energy simulation software includes at least one of an office building, a high energy consumption factory, a low energy consumption factory, a shopping center, a school, a restaurant, a residential building and a complex building.

4. The method of claim 1, after the step of automatically or manually selecting the building category, further comprising:
    in accordance with the selected building category, loading a plurality of subordinate building categories from the building energy simulation software and loading a plurality of predetermined values corresponding to the subordinate building categories, respectively, or manually inputting a plurality of values correspond to the plurality of subordinate building categories, respectively.

5. The method of claim 1, wherein the data of the building information model includes information of at least one room, the method further comprises:
    in accordance with the data of the building information model, automatically defining a type of the at least one room, respectively, or manually defining a type of the at least one room, respectively.

6. The method of claim 5, wherein the plurality of parameters includes personnel density, lighting density and/or equipment density corresponding each of the at least one room, and wherein the information of the at least one room includes the numbering of the at least one room.

7. The method of claim 1, further comprising:
    in accordance with the selected building category, loading a plurality of subordinate building categories from the building energy simulation software, and in accordance with the data of the building information model, loading values comprising volume ratio, personnel density, lighting density and/or equipment density corresponding to each of the plurality of subordinate building categories.

8. The method of claim 1, wherein the step of inputting the plurality of parameters into the lookup table comprises:
in accordance with the selected building category, providing a plurality of subordinate building categories by the building energy simulation software;
locating at least one parameter corresponding to the plurality of subordinate building categories from the data of the building information modeling and inputting the at least one parameter into the lookup table; and
when there is no parameter being located, in accordance with the database, inputting a parameter corresponding to the subordinate building categories into the lookup table.

9. The method of claim 1, wherein the plurality of parameters includes the number of floors, orientations, a building length, a building width, a building height, visible transmittance of an object, solar heat gain coefficient of a window, outdoor lighting schedule, air-conditioning schedule and/or geographical location.

10. The method of claim 1, further comprising:
receiving an actual result of energy consumption;
comparing the actual result with the estimation of the building energy consumption to generate a comparison value; and
if the comparison value exceeds a predetermined threshold, transmitting an alarm signal.

11. The method of claim 10, wherein the estimation of the building energy consumption includes an estimation of a first room and an estimation of a second room, the actual result of energy consumption includes an actual result of a first room and an actual result of a second room, the step of comparing the actual result with the estimation of the building energy consumption comprises:
comparing the actual result of the first room with the estimation of the first room so as to generate a first comparison value, and comparing the actual result of the second room with the estimation of the second room so as to generate a second comparison value;
wherein the predetermined threshold includes a first predetermined threshold and a second predetermined threshold, and the step of transmitting the alarm signal comprises:
if the first comparison value exceeds the first predetermined threshold, transmitting a first alarm signal; and
if the second comparison value exceeds the second predetermined threshold, transmitting a second alarm signal.

12. The method of claim 1, wherein the step of inputting the building information modeling data comprises:
loading the building information modeling data into a first software.

13. The method of claim 12, wherein the step of defining attributes of the objects of the first category further comprises:
exporting the building information modeling data to a first file in a second software, the data format of the first file being different from that of the building information modeling data.

14. The method of claim 1, the step of readjusting the first category of objects further comprises:
determining whether an object of the plurality of objects is under the first category, and whether the one of the plurality of objects has a thickness defined by a first plane and a second plane; and
merging the first plane and the second plane into a third plane therebetween where the object is under the first category and has the thickness.

15. The method of claim 1, wherein the step of readjusting the first category of objects further comprises:
determining whether two nearby objects of the plurality of objects are under the first category, are different objects, and are co-planar; and
displacing one of the two objects away from the other of the two objects so that they are not co-planar, where the two objects are under the first category, are two different objects and are co-planar.

16. The method of claim 1, wherein the step of readjusting the first category of objects further comprises:
determining whether a first space formed by a portion of the plurality of objects is a subordinate space of a second space; and
incorporating the first space into the second space when the first space is the subordinate space of the second space.

17. The method of claim 1, further comprising:
performing a space definition step by enclosing spaces formed by the plurality of objects.

18. The method of claim 17, wherein the space definition step further comprises:
determining whether the plurality of the objects of the building information modeling data constructs at least one floor of a building;
illustrating a plurality of objects of an upper floor of the at least one floor and a plurality of objects of a lower floor of the at least one floor, where the plurality of the objects of the building information modeling data constructs at least one floor of a building;
retaining only a bottom board of the objects of the upper floor and removing the other objects of the upper floor; and
retaining a top board of the objects of the lower floor and removing the other objects of the lower floor.

19. The method of claim 1, wherein the step of inputting the data of the building information model into the building energy simulation software further comprises:
exporting the building information modeling data to a second file, the data format of the second file being different from that of the first file.

20. A system for processing a building information modeling data, comprising:
a non-transitory computer-readable storage medium comprising computer-readable instructions and one or more processors configured to receive the computer-readable instructions to perform:
inputting data of a building information model that includes a plurality of objects;
identifying the plurality of objects to generate results of identification;
dividing the plurality of objects into a first category and a second category in accordance with the results of identification;
removing the second category of objects;
readjusting the first category of objects in accordance with a predetermined rule of building energy simulation software;
defining attributes of the first category of objects;
inputting the data of the building informational model into building energy simulation software;

automatically selecting a building category or manually selecting a building category from a group of building categories provided by the building energy simulation software;

in response to the selected building category, inputting multiple parameters into a lookup table of the building energy simulation software in accordance with a database of the building energy simulation software; and generating an estimation of a building's energy consumption through a calculation by the building energy simulation software based on the parameters;

wherein the step of readjusting the first category of objects further comprises:

determining whether an object of the plurality of objects is under the first category and whether the object has an irregular surface; and planarizing the object where the object is under the first category and has the irregular surface.

\* \* \* \* \*